US011387656B2

(12) United States Patent
Kato et al.

(10) Patent No.: US 11,387,656 B2
(45) Date of Patent: Jul. 12, 2022

(54) POWER GENERATION AMOUNT PREDICTION APPARATUS, POWER GENERATION AMOUNT PREDICTION METHOD, SYSTEM STABILIZATION APPARATUS, AND SYSTEM STABILIZATION METHOD

(71) Applicant: Hitachi, Ltd., Tokyo (JP)

(72) Inventors: Daichi Kato, Tokyo (JP); Nao Saito, Tokyo (JP); Masahiro Yatsu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1005 days.

(21) Appl. No.: 16/060,107

(22) PCT Filed: Oct. 26, 2016

(86) PCT No.: PCT/JP2016/081702
§ 371 (c)(1),
(2) Date: Jun. 7, 2018

(87) PCT Pub. No.: WO2017/098827
PCT Pub. Date: Jun. 15, 2017

(65) Prior Publication Data
US 2020/0266628 A1 Aug. 20, 2020

(30) Foreign Application Priority Data

Dec. 7, 2015 (JP) .............................. JP2015-238277

(51) Int. Cl.
*H02J 3/38* (2006.01)
*H02J 3/00* (2006.01)
*G05B 19/042* (2006.01)

(52) U.S. Cl.
CPC ............ *H02J 3/381* (2013.01); *G05B 19/042* (2013.01); *H02J 3/004* (2020.01);
(Continued)

(58) Field of Classification Search
CPC ........ H02J 3/381; H02J 3/004; H02J 2203/20; H02J 2300/20; H02J 3/382; H02J 3/00;
(Continued)

(56) References Cited

U.S. PATENT DOCUMENTS

2006/0276938 A1* 12/2006 Miller ........................ H02J 3/00
700/295
2013/0013233 A1 1/2013 Murakami et al.

FOREIGN PATENT DOCUMENTS

EP 2 549 641 A1 1/2013
JP 2011-200040 A 10/2011
(Continued)

OTHER PUBLICATIONS

Sharma et al, "Predicting Solar Generation from Weather Forecasts Using Machine Learning", 2011 pp. 528-533 downloaded from https://ieeexplore.ieee.org/stamp/stamp.jsp?tp=&arnumber=6102379 (Year: 2011).*

(Continued)

*Primary Examiner* — Rocio Del Mar Perez-Velez
*Assistant Examiner* — Olvin Lopez Alvarez
(74) *Attorney, Agent, or Firm* — Crowell & Moring LLP

(57) ABSTRACT

To calculate the prediction of the power generation amount with high accuracy even when the amount of the track record data of the Generator power generation amount is insufficient or the amount of the weather track record data similar to the weather prediction result is small. A power generation amount prediction apparatus for predicting a power generation amount at a power plant that performs power generation by use of renewable energy, including: a model generation unit that generates a mathematical model of the power generation amount of the power plant in regard to each model generation time based on a weather track record and an output power track record in regard to the power plant; a (Continued)

similar track record data extraction unit that obtains a weather track record similar to weather prediction data and a corresponding output power track record as similar track record data; a model accuracy calculation unit that calculates accuracy of each of a plurality of mathematical models of the model generation unit in a weather condition similar to the weather prediction data; a model selection unit that selects a mathematical model to be used for the prediction by using the accuracy of each of the models; and a model output power prediction unit that predicts the power generation amount of the power plant by using the selected mathematical model.

12 Claims, 21 Drawing Sheets

(52) U.S. Cl.
CPC ... *G05B 2219/2639* (2013.01); *H02J 2203/20* (2020.01); *H02J 2300/20* (2020.01)

(58) Field of Classification Search
CPC .......... G05B 19/042; G05B 2219/2639; Y02E 60/00; Y04S 40/20; Y02A 30/00
See application file for complete search history.

(56) References Cited

FOREIGN PATENT DOCUMENTS

| | | | |
|---|---|---|---|
| JP | 2012-23816 A | 2/2012 | |
| JP | 2014-21555 A | 2/2014 | |
| JP | 2014-157457 A | 8/2014 | |
| JP | 5661594 | * 1/2015 | ............. Y02E 10/50 |
| JP | 2015138912 | * 7/2015 | ............. Y02E 10/56 |
| JP | 5797599 | * 10/2015 | ............. Y02E 10/72 |
| TW | 201539973 | * 10/2015 | ............. Y02E 10/50 |
| WO | WO 2013/169903 A1 | 11/2013 | |

OTHER PUBLICATIONS

Cococcioni et al, "24-hour-ahead forecasting of energy production in solar PV systems", 2011, pp. 1276-1281, downloaded from https://ieeexplore.ieee.org/document/6121835 (Year: 2011).*
Shi et al "Forecasting Power Output of Photovoltaic Systems Based on Weather Classification and Support Vector Machines", 2012 , pp. 1064-1069 downloaded from https://ieeexplore.ieeee.org/document/6168891 (Year: 2012).*
International Search Report (PCT/ISA/210) issued in PCT Application No. PCT/JP2016/081702 dated Dec. 20, 2016 with English translation (two (2) pages).
Japanese-language Written Opinion (PCT/ISA/237) issued in PCT Application No. PCT/JP2016/081702 dated Dec. 20, 2016 (three (3) pages).
Extended European Search Report issued in counterpart European Application No. 16872727.9 dated Jun. 25, 2019 (11 pages).
Alexiadis et al., "Wind Speed and Power Forecasting based on Spatial Correlation Models", IEEE Transactions on Energy Conversion, Sep. 1, 1999, pp. 836-842, vol. 14, No. 3, XP011084512 (seven pages).
Yokoyama et al., "System Engineering of the Electric Power System Stabilization", The Institute of Electrical Engineers of Japan, 2014, pp. 54-57 (two (2) pages).
Yokoyama et al., "System Engineering of the Electric Power System Stabilization," The Institute of Electrical Engineers of Japan, 2014, pp. 189-191 (two (2) pages).

* cited by examiner

D210
DATE: YYYY/MM/DD
D211 — POINT: A

| HR:MIN:SEC | WIND DIRECTION | WIND SPEED (m/s) | INSOLATION (kW/m$^2$) |
|---|---|---|---|
| 00:00:00 | NW | 0.5 | 0 |
| 00:00:10 | NW | 0.6 | 0 |
| 00:00:20 | N | 0.7 | 0 |
| ⋮ | ⋮ | ⋮ | ⋮ |
| 12:30:10 | S | 1.1 | 0.41 |
| 12:30:20 | SE | 1.2 | 0.42 |
| ⋮ | ⋮ | ⋮ | ⋮ |

(D212, D213, D214, D215)

POINT: B

| HR:MIN:SEC | WIND DIRECTION | WIND SPEED (m/s) | INSOLATION (kW/m$^2$) |
|---|---|---|---|
| 00:00:00 | W | 0.3 | 0 |
| 00:00:10 | W | 0.3 | 0 |
| 00:00:20 | NW | 0.3 | 0 |
| ⋮ | ⋮ | ⋮ | ⋮ |
| 12:30:10 | SE | 0.2 | 0.41 |
| 12:30:20 | SE | 0.1 | 0.11 |
| ⋮ | ⋮ | ⋮ | ⋮ |

DATE: 2015/01/03
POINT: A

D220 — DATE: 2015/01/02
POINT: A

D221 — DATE: 2015/01/01
POINT: A

D222  D223  D224  D225

| HR:MIN:SEC | WIND DIRECTION | WIND SPEED (m/s) | INSOLATION (kW/m$^2$) |
|---|---|---|---|
| 00:00:00 | NW | 0.5 | 0 |
| 00:00:10 | NW | 0.6 | 0 |
| 00:00:20 | N | 0.7 | 0 |
| ⋮ | ⋮ | ⋮ | ⋮ |
| 12:30:10 | S | 1.1 | 0.41 |
| 12:30:20 | SE | 1.0 | 0.42 |
| ⋮ | ⋮ | ⋮ | ⋮ |

POINT: B

| HR:MIN:SEC | WIND DIRECTION | WIND SPEED (m/s) | INSOLATION (kW/m$^2$) |
|---|---|---|---|
| 00:00:00 | W | 0.3 | 0 |
| 00:00:10 | W | 0.3 | 0 |
| 00:00:20 | NW | 0.3 | 0 |
| ⋮ | ⋮ | ⋮ | ⋮ |
| 12:30:10 | SE | 0.2 | 0.41 |
| 12:30:20 | SE | 0.1 | 0.11 |
| ⋮ | ⋮ | ⋮ | ⋮ |

DATE: 2015/01/03
POINT: A

D230 — DATE: 2015/01/02
POINT: A

D231 — DATE: 2015/01/01
POINT: A

| HR:MIN:SEC (D232) | WIND POWER PLANT WTA1 (kW) (D233) | PHOTOVOLTAIC POWER PLANT PVA1 (kW) (D234) | WIND POWER PLANT WTA2 (kW) (D235) |
|---|---|---|---|
| 00:00:00 | 3050 | 0 | 0 |
| 00:00:10 | 3030 | 0 | 0 |
| 00:00:20 | 3020 | 0 | 0 |
| ⋮ | ⋮ | ⋮ | ⋮ |
| 12:30:10 | 1510 | 3000 | 0.41 |
| 12:30:20 | 1520 | 3010 | 0.42 |
| ⋮ | ⋮ | ⋮ | ⋮ |

POINT: B

| HR:MIN:SEC | WIND POWER PLANT WTB1 (kW) | PHOTOVOLTAIC POWER PLANT PVB1 (kW) | WIND POWER PLANT PVB2 (kW) |
|---|---|---|---|
| 00:00:00 | 2050 | 0 | 0 |
| 00:00:10 | 2060 | 0 | 0 |
| 00:00:20 | 2000 | 0 | 0 |
| ⋮ | ⋮ | ⋮ | ⋮ |
| 12:30:10 | 1500 | 3050 | 0.41 |
| 12:30:20 | 1410 | 1010 | 0.11 |
| ⋮ | ⋮ | ⋮ | ⋮ |

| | WIND POWER PLANT WTA1 | PHOTOVOLTAIC POWER PLANT PVA1 | WIND POWER PLANT WTA2 | WIND POWER PLANT WTB1 | PHOTOVOLTAIC POWER PLANT PVB1 | PHOTOVOLTAIC POWER PLANT PVB2 |
|---|---|---|---|---|---|---|
| POINT | A | A | A | B | B | B |
| INSTALLATION DIRECTION | E | S | E | W | S | S |
| LANDFORM | MOUNTAIN | FLATLAND | MOUNTAIN | FLATLAND | FLATLAND | MOUNTAIN |
| ... | ... | ... | ... | ... | ... | ... |

| | WIND POWER PLANT WTA1 | PHOTOVOLTAIC POWER PLANT PVA1 | WIND POWER PLANT WTA2 | WIND POWER PLANT WTB1 | ... |
|---|---|---|---|---|---|
| k−1 | $y(j)=G^{WTA1}_{k-1}(q)u(j)$ $+H^{WTA1}_{k-1}(q)w(j)$<br><br>CHARACTERISTIC: WTA1<br>INSTALLATION CONDITION: WTA1 | $y(j)=G^{PVA1}_{k-1}(q)u(j)$ $+H^{PVA1}_{k-1}(q)w(j)$<br><br>CHARACTERISTIC: PVA1<br>INSTALLATION CONDITION: PVA1 | $y(j)=G^{WTA2}_{k-1}(q)u(j)$ $+H^{WTA2}_{k-1}(q)w(j)$<br><br>CHARACTERISTIC: WTA2<br>INSTALLATION CONDITION: WTA2 | $y(j)=G^{WTB1}_{k-1}(q)u(j)$ $+H^{WTB1}_{k-1}(q)w(j)$<br><br>CHARACTERISTIC: WTB1<br>INSTALLATION CONDITION: WTB1 | ... |
| k−2 | $y(j)=G^{WTA1}_{k-2}(q)u(j)$ $+H^{WTA1}_{k-2}(q)w(j)$<br><br>CHARACTERISTIC: WTA1<br>INSTALLATION CONDITION: WTA1 | $y(j)=G^{PVA1}_{k-2}(q)u(j)$ $+H^{PVA1}_{k-2}(q)w(j)$<br><br>CHARACTERISTIC: PVA1<br>INSTALLATION CONDITION: PVA1 | $y(j)=G^{WTA2}_{k-2}(q)u(j)$ $+H^{WTA2}_{k-2}(q)w(j)$<br><br>CHARACTERISTIC: WTA2<br>INSTALLATION CONDITION: WTA2 | $y(j)=G^{WTB1}_{k-2}(q)u(j)$ $+H^{WTB1}_{k-2}(q)w(j)$<br><br>CHARACTERISTIC: WTB1<br>INSTALLATION CONDITION: WTB1 | ... |
| k−3 | $y(j)=G^{WTA1}_{k-3}(q)u(j)$ $+H^{WTA1}_{k-3}(q)w(j)$<br><br>CHARACTERISTIC: WTA1<br>INSTALLATION CONDITION: WTA1 | $y(j)=G^{PVA1}_{k-3}(q)u(j)$ $+H^{PVA1}_{k-3}(q)w(j)$<br><br>CHARACTERISTIC: PVA1<br>INSTALLATION CONDITION: PVA1 | $y(j)=G^{WTA2}_{k-3}(q)u(j)$ $+H^{WTA2}_{k-3}(q)w(j)$<br><br>CHARACTERISTIC: WTA2<br>INSTALLATION CONDITION: WTA2 | $y(j)=G^{WTB1}_{k-3}(q)u(j)$ $+H^{WTB1}_{k-3}(q)w(j)$<br><br>CHARACTERISTIC: WTB1<br>INSTALLATION CONDITION: WTB1 | ... |
| ⋮ | ⋮ | ⋮ | ⋮ | ⋮ | ⋮ |

POWER GENERATION AMOUNT PREDICTION APPARATUS, POWER GENERATION AMOUNT PREDICTION METHOD, SYSTEM STABILIZATION APPARATUS, AND SYSTEM STABILIZATION METHOD

TECHNICAL FIELD

The present invention relates to a power generation amount prediction apparatus for predicting a power generation amount of renewable energy (photovoltaic power generation, wind power generation, etc.), a power generation amount prediction method, a system stabilization apparatus, and a system stabilization method.

BACKGROUND ART

JP-2011-200040-A (Patent Document 1) describes a technology known as a background technology regarding the prediction of the power generation amount of renewable energy (photovoltaic power generation, wind power generation, etc.). In the description of Patent Document 1, a power generation amount prediction apparatus 1 includes a storage unit 20 for storing past data in regard to a past power generation amount of a generator and a predictive value calculation unit 13 for calculating predictive values in regard to the power generation amount, as time-series data including occurrence probability, based on statistical correlation between different times in the past data or statistical correlation between different generator positions in the past data. The predictive value calculation unit 13 includes a variance-covariance matrix generation unit 131 for generating a variance-covariance matrix based on the past data and a random number generation unit 132 for generating random numbers based on the variance-covariance matrix.

PRIOR ART DOCUMENT

Patent Document

Patent Document 1: JP-2011-200040-A

SUMMARY OF THE INVENTION

Problem to be Solved by the Invention

In the future, introducing a great amount of renewable energy (photovoltaic power generation, wind power generation, etc.) into an electric power system leads to flow fluctuation that is uncertain and difficult to predict. Therefore, the power generation amount prediction of renewable energy is essential and Patent Document 1 proposes one solution.

However, in Patent Document 1, the power generation amount predictive values are calculated based exclusively on track record data, and thus there is a problem in that the prediction error of the power generation amount increases when the generator does not have a sufficient amount of track record data or the amount of weather track record data similar to a weather prediction result is small.

It is therefore an object of the present invention to provide a power generation amount prediction apparatus, a power generation amount prediction method, a system stabilization apparatus, and a system stabilization method with which the prediction of the power generation amount can be calculated with high accuracy even when the amount of the track record data of the generator power generation amount is insufficient or the amount of the weather track record data similar to the weather prediction result is small.

Means for Solving the Problem

To resolve the above-described problem, configurations described in claims are employed, for example.

While the present application contains multiple means for resolving the above-described problem, an example of the means is as follows:

A power generation amount prediction apparatus for predicting a power generation amount at a power plant that performs power generation by use of renewable energy, including: a model generation unit that generates a mathematical model of the power generation amount of the power plant in regard to each model generation time based on a weather track record and an output power track record in regard to the power plant; a similar track record data extraction unit that obtains a weather track record similar to weather prediction data and a corresponding output power track record as similar track record data; a model accuracy calculation unit that calculates accuracy of each of a plurality of mathematical models of the model generation unit in a weather condition similar to the weather prediction data; a model selection unit that selects a mathematical model to be used for the prediction by using the accuracy of each of the models; and a model output power prediction unit that predicts the power generation amount of the power plant by using the selected mathematical model.

The present invention also provides a power generation amount prediction method for predicting a power generation amount at a power plant that performs power generation by use of renewable energy, in which the power generation amount of the power plant is predicted by: generating a mathematical model of the power generation amount of the power plant in regard to each model generation time based on a weather track record and an output power track record in regard to the power plant; and selecting a mathematical model to be used for the prediction from a plurality of the mathematical models by calculating accuracy of each of the mathematical models in a weather condition similar to weather prediction data.

The present invention also provides a system stabilization apparatus that stabilizes an electric power system, including a power plant performing power generation by use of renewable energy, by using the power generation amount prediction apparatus, including: a system condition prediction unit that predicts a system condition of the electric power system including the power plant performing the power generation by use of renewable energy in terms of a time series; a control target determination unit that determines a control target for the system stabilization when deterioration in the system condition is predicted; and a control command unit that transmits a control command to the determined control target to make the control target perform control.

The present invention also provides a system stabilization method for stabilizing an electric power system, including a power plant performing power generation by use of renewable energy, by using the power generation amount prediction method, in which a system condition of the electric power system including the power plant performing the power generation by use of renewable energy is predicted in terms of a time series, a control target for the system stabilization is determined when deterioration in the system condition is predicted, and a control command is transmitted to the determined control target to make the control target perform control.

Effect of Invention

According to the present invention, the output power of each type of renewable energy can be predicted with high accuracy.

BRIEF DESCRIPTION OF THE DRAWINGS

FIG. 4 is a diagram showing an example of weather prediction data D21 stored in a weather prediction database DB21.

FIG. 5 is a diagram showing an example of weather track record data D22 stored in a weather track record database DB22.

FIG. 6 is a diagram showing an example of renewable energy output power track record data D23 stored in a renewable energy output power track record database DB23.

FIG. 8 is a diagram showing an example of renewable energy installation condition data D25.

FIG. 13 is a diagram showing an example of a renewable energy model generation result.

MODE FOR CARRYING OUT THE INVENTION

Figure 1:
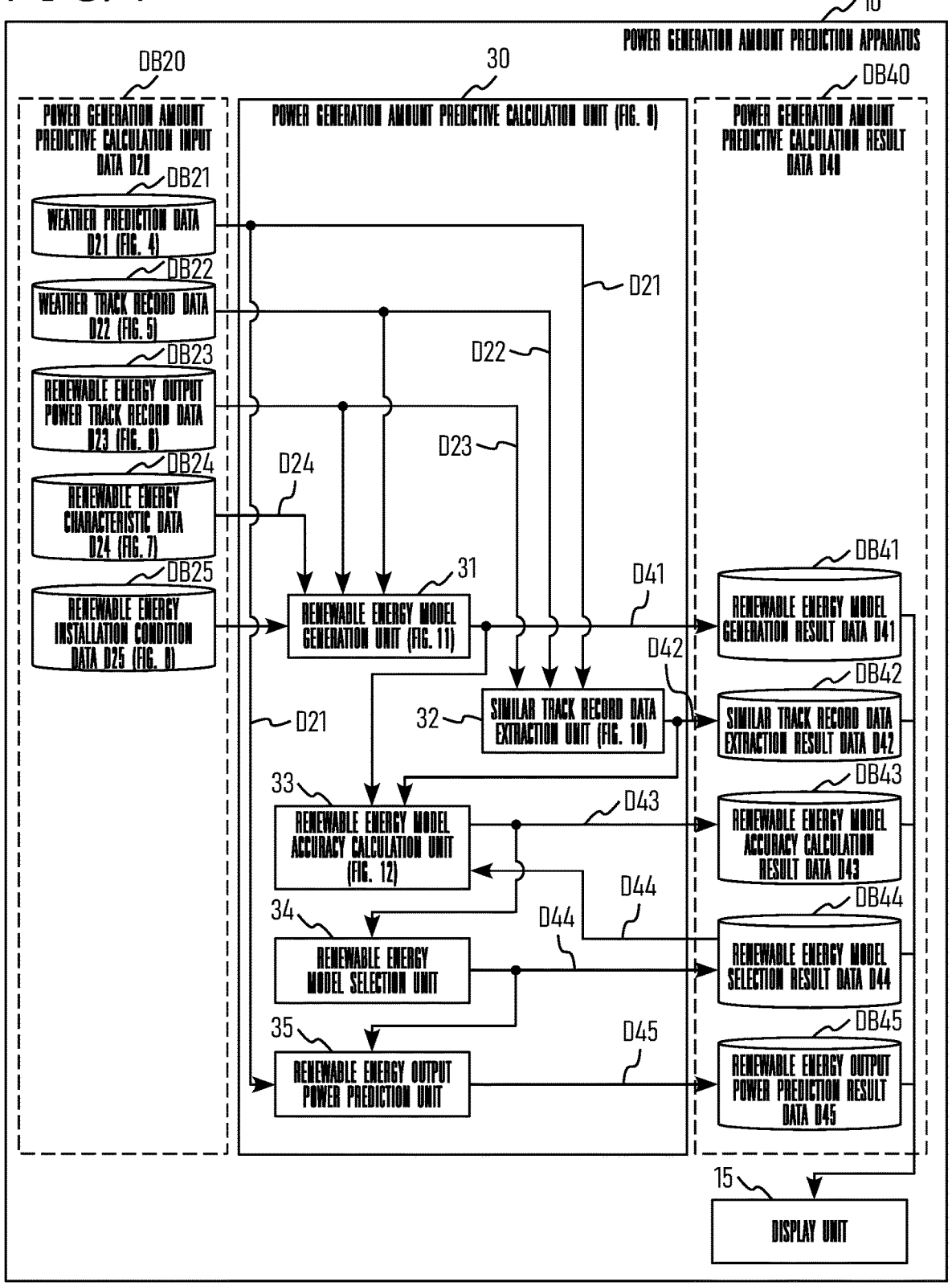
FIG. 1 is a diagram showing an example of the overall configuration of a power generation amount prediction apparatus 10 according to a first embodiment.

Referring now to the drawings, a description will be given in detail of preferred embodiments in accordance with the present invention.

First Embodiment

FIG. 1 is a diagram showing an example of the overall configuration of a power generation amount prediction apparatus 10 according to a first embodiment. FIG. 1 shows the power generation amount prediction apparatus 10 in terms of its functional configuration.

The power generation amount prediction apparatus 10 includes a power generation amount predictive calculation input database DB20, a power generation amount predictive calculation unit 30, a power generation amount predictive calculation result database DB40 and a display unit 15.

The power generation amount predictive calculation input database DB20 is formed of a plurality of databases DB21 to DB25.

Among these databases, a weather prediction database DB21 stores weather prediction data D21 illustrated in FIG. 4. A weather track record database DB22 stores weather track record data D22 illustrated in FIG. 5. A renewable energy output power track record database DB23 stores renewable energy output power track record data D23 illustrated in FIG. 6. A renewable energy characteristic database DB24 stores renewable energy characteristic data D24 illustrated in FIG. 7. A renewable energy installation condition database DB25 stores renewable energy installation condition data D25 illustrated in FIG. 8. In short, these databases store predictions and track records in regard to the weather, track records in regard to the output power, and characteristics and installation conditions in regard to power plants. Detailed examples of these memory contents will be described later.

The power generation amount predictive calculation unit 30 has a function of performing predictive calculation of the amount of power generation by use of renewable energy. A series of steps performed by the power generation amount predictive calculation unit 30 are shown in a flow chart of FIG. 9. The processing function of the power generation amount predictive calculation unit 30 is implemented by processing function units 31 to 35 described below.

Among these processing function units, a renewable energy model generation unit 31 has a function of generating a renewable energy model. A series of steps performed by the renewable energy model generation unit 31 are shown in a flow chart of FIG. 11. A similar track record data extraction unit 32 has a function of extracting similar track record data. A series of steps performed by the similar track record data extraction unit 32 are shown in a flow chart of FIG. 10. A renewable energy model accuracy calculation unit 33 has a function of calculating accuracy of the renewable energy model. A series of steps performed by the renewable energy model accuracy calculation unit 33 are shown in a flow chart of FIG. 12. Further, a renewable energy model selection unit 34 has a function of selecting a renewable energy model, and a renewable energy output power prediction unit 35 has a function of predicting renewable energy output power.

The power generation amount predictive calculation result database DB40 is formed of a plurality of databases DB41 to DB45. Briefly stated, these databases DB41 to DB45 respectively accumulate and store the result of the processing by the processing function units 31 to 35.

Among these databases, a renewable energy model generation result database DB41 stores renewable energy model generation result data D41 generated by the renewable energy model generation unit 31. A similar track record data extraction result database DB42 stores similar track record data extraction result data D42 obtained by the extraction by the similar track record data extraction unit 32. A renewable energy model accuracy calculation result database DB43 stores renewable energy model accuracy calculation result data D43 obtained by the calculation by the renewable energy model accuracy calculation unit 33. A renewable energy model selection result database DB44 stores renewable energy model selection result data D44 obtained by the selection by the renewable energy model selection unit 34. A renewable energy output power prediction result database DB45 stores renewable energy output power prediction result data D45 obtained by the prediction by the renewable energy output power prediction unit 35. Incidentally, these data stored in the power generation amount predictive calculation result database DB40 include not only data as calculation result but also data of result in the middle of processing so that the data can be used in appropriate situations.

On the display unit 15, various types of data handled in the power generation amount prediction apparatus 10 are displayed after being appropriately processed into an easy-to-see format. Functions of the display unit 15 include input means such as a mouse and a keyboard, and the result of the input is properly incorporated into the display on the display screen.

As described above, input data for the power generation amount prediction apparatus 10 are stored and kept in the power generation amount predictive calculation input database DB20 and these input data include the weather prediction data D21, the weather track record data D22, the renewable energy output power track record data D23, the renewable energy characteristic data D24, the renewable energy installation condition data D25, and so forth.

The renewable energy model generation unit 31 of the power generation amount prediction apparatus 10 generates a model of renewable energy by using the weather track record data D22, the renewable energy output power track record data D23, the renewable energy characteristic data D24 and the renewable energy installation condition data D25 and outputs the renewable energy model generation result data D41.

The similar track record data extraction unit 32 of the power generation amount prediction apparatus 10 extracts weather track record data similar to the weather prediction data and renewable energy output power track record data at the time of the weather by using the weather prediction data D21, the weather track record data D22 and the renewable energy output power track record data D23 and outputs the similar track record data extraction result data D42.

The renewable energy model accuracy calculation unit 33 of the power generation amount prediction apparatus 10 calculates the accuracy of the renewable energy model by using the renewable energy model generation result data D41, the similar track record data extraction result data D42 and the renewable energy model selection result data D44 and outputs the renewable energy model accuracy calculation result data D43.

The renewable energy model selection unit 34 of the power generation amount prediction apparatus 10 selects a renewable energy model to be used for the output power prediction by using the renewable energy model accuracy calculation result data D43 and outputs the renewable energy model selection result data D44.

The renewable energy output power prediction unit 35 of the power generation amount prediction apparatus 10 predicts the renewable energy output power by using the weather prediction data D21 and the renewable energy model selection result data D44 and outputs the renewable energy output power prediction result data D45. The display unit 15 of the power generation amount prediction apparatus 10 displays information on each calculation result by using data such as power generation amount predictive calculation result data D40.

Figure 2:
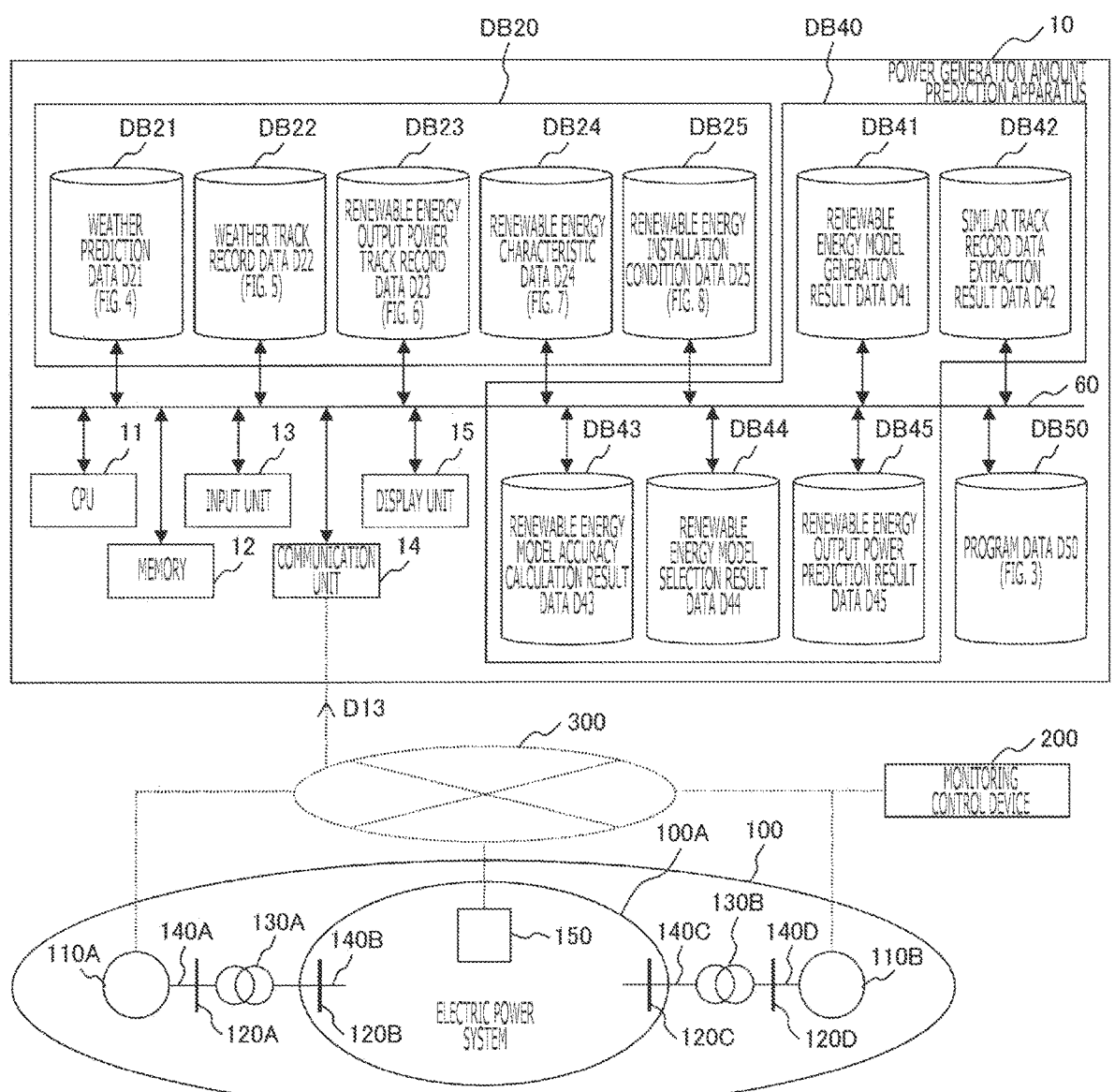
FIG. 2 is a diagram showing an example of the overall configuration of a power generation amount prediction system in a case where the power generation amount prediction apparatus of FIG. 1 is employed for an electric power system.

FIG. 2 is a diagram showing an example of the overall configuration of a power generation amount prediction system in a case where the power generation amount prediction apparatus of FIG. 1 is employed for an electric power system. Incidentally, the configuration of the power generation amount prediction apparatus 10 in FIG. 2 is described in terms of a hardware configuration.

In FIG. 2, the electric power system 100 for which the power generation amount prediction apparatus 10 is employed means a power transmission system 100A in a narrow sense, while also being a concept including a power generation system in a broad sense. While the electric power system 100 in the diagram is described as an example including generators 110 (110A, 110B), buses 120 (nodes: 120A, 120B, 120C, 120D), transformers 130 (130A, 130B), power transmission lines 140 (branches: 140A, 140B, 140C, 140D), and so forth, the electric power system 100 is configured to further include one or more selected from loads and other controllable devices (battery, rechargeable secondary battery, storage battery for EV, flywheel, etc.).

The above-described facilities and devices constituting the electric power system are monitored and controlled from the viewpoint of securing high stability of the electric power system. For example, appropriate control/protection is carried out according to control signals from a monitoring control device 200. On the other hand, for the monitoring control, measurement signals D13 in regard to electric current, voltage and other conditions at each position are taken into the monitoring control device 200 from various measurement devices 150 arranged at various positions in the electric power system directly or indirectly via a communication network 300. The power generation amount prediction apparatus 10 according to the present invention also takes in measurement signals from various measurement devices 150 in a similar manner. Here, the generators 110 include not only a large-sized power source such as a thermal power generator, a hydroelectric power generator or a nuclear power generator but also a dispersed power source such as a photovoltaic power generator or a wind power generator.

Here, the measurement device 150 is a device that measures one or more selected from node voltage V, branch current I, a power factor $\Phi$, active power P and reactive power Q (e.g., a transformer (VT: Voltage Transformer, PT: Potential Transformer) for a measurement instrument or a current transformer (CT: Current Transformer) for a measurement instrument) or the like, and has a function of transmitting data including a data measurement position ID and an internal time stamp of the measurement device (e.g., telemeter (TM)). Incidentally, the measurement device 150 can also be a device that measures electric power information (phasor information on voltage) with attached absolute time information by use of GPS, a phasor measurement unit (PMU), or a different type of measurement instrument. Further, while the measurement device 150 is described to be situated in the electric power system 100A in the narrow sense, the measurement device 150 may be provided on a bus, a line or the like connecting to a generator 110, a transformer 130, a measurement device 150 and a load.

The measurement signals D13 represent the aforementioned various types of data (system data) obtained by the measurement by the measurement devices 150 and are received by a system database (not shown) via the communication network 300. However, instead of directly receiving the system data from the measurement devices 150, the system database may also receive the system data, once collected in the monitoring control device 200, via the communication network 300, or receive the system data from both the measurement devices 150 and the monitoring control device 200 via the communication network 300. Incidentally, the system data D13 may include a unique number for identifying the data and a time stamp. Further, while the system data D13 have been described as data obtained by measurement, the system data D13 can also be data previously held in the system database.

The hardware configuration of the power generation amount prediction apparatus 10 shown in FIG. 2 will be described below. The power generation amount prediction apparatus 10 includes the display unit 15, an input unit 13 such as a keyboard and a mouse, a communication unit 14, a computer or computer server (CPU: Central Processing Unit) 11, a memory 12, the power generation amount predictive calculation input database DB20 (the weather prediction database DB21, the weather track record database DB22, the renewable energy output power track record database DB23, the renewable energy characteristic database DB24 and the renewable energy installation condition database DB25), the power generation amount predictive calculation result database DB40 (the renewable energy model generation result database DB41, the similar track record data extraction result database DB42, the renewable energy model accuracy calculation result database DB43, the renewable energy model selection result database DB44 and the renewable energy output power prediction result database DB45), and a program database DB50 that are connected to a bus line 60.

Among the above components, the display unit 15 is configured as a display device, for example. The display unit 15 may also be configured to employ a printer device, a sound output device or the like instead of or in addition to the display device, for example.

The input unit 13 can be configured to include at least one selected from a keyboard switch, a pointing device such as a mouse, a touch panel, a voice commanding device, and so forth, for example.

The communication unit 14 is equipped with a circuit and a communication protocol for connecting to the communication network 300.

The CPU 11 loads a prescribed computer program from the program database DB50 and executes the computer program. The CPU 11 may be configured as one or more semiconductor chips or a computer device such as a computer server.

The memory 12 is configured as a RAM (Random Access Memory), for example. The memory 12 stores computer programs loaded from the program database DB50, stores calculation result data, image data, etc. necessary for each process, and so forth. The image data stored in the memory 12 is sent to the display unit 15 to be displayed. Examples of the displayed screen will be described later.

Figure 3:
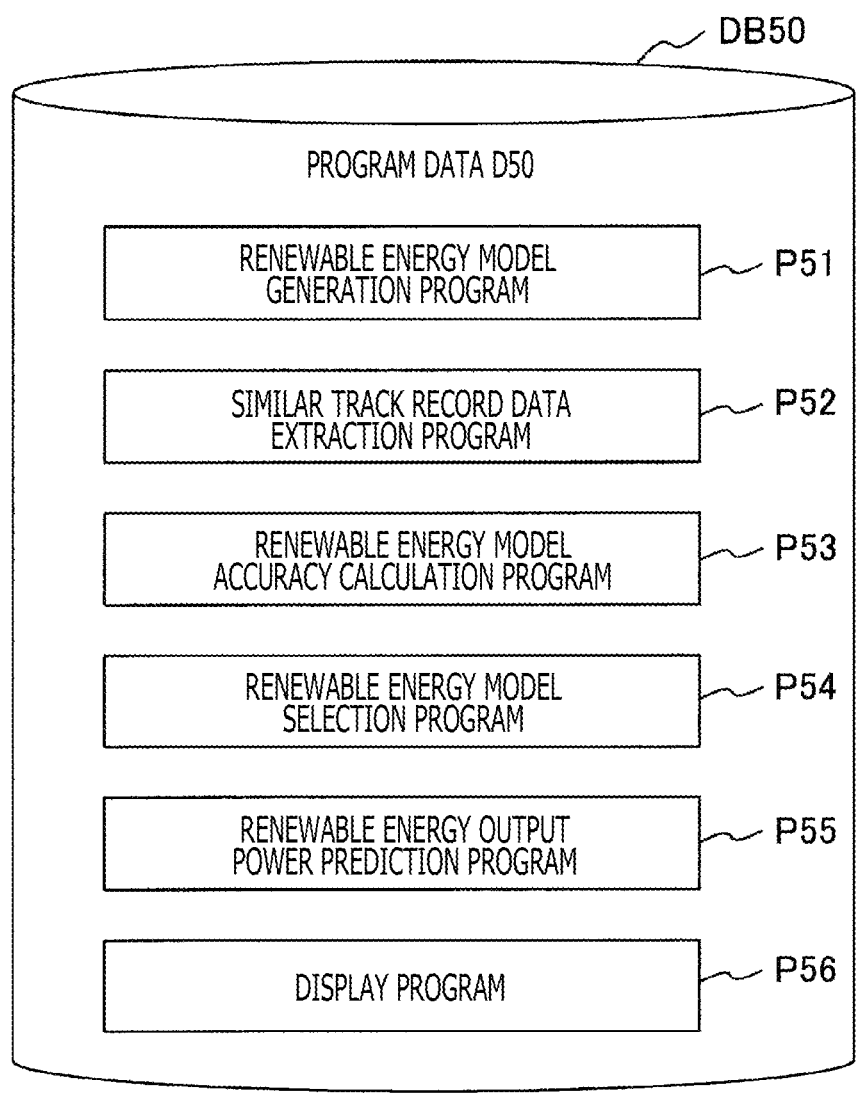
FIG. 3 is a diagram showing a configuration example illustrating the contents of programs and data in the power generation amount prediction apparatus.

Here, memory contents of the program database DB50 will be explained with reference to FIG. 3. FIG. 3 is a diagram showing a configuration example illustrating the contents of programs and data in the power generation amount prediction apparatus 10. The program database DB50 stores a renewable energy model generation program P51, a similar track record data extraction program P52, a renewable energy model accuracy calculation program P53, a renewable energy model selection program P54, a renewable energy output power prediction program. P55 and a display program P56, for example.

Returning to FIG. 2, the CPU 11 successively executes arithmetic programs loaded from the program database DB50 into the memory 12 (the renewable energy model generation program P51, the similar track record data extraction program P52, the renewable energy model accuracy calculation program P53, the renewable energy model selection program P54, the renewable energy output power prediction program P55 and the display program P56) and thereby carries out the generation of the renewable energy model, the extraction of the similar track record data, the calculation of the renewable energy model accuracy, the selection of the renewable energy model, the prediction of the renewable energy output power, commanding of image data to be displayed, a search for data in various databases, and so forth.

The memory 12 is a memory for temporarily storing calculation temporary data and calculation result data, such as image data to be displayed, the renewable energy model selection result data and the renewable energy output power prediction result data. Necessary image data is generated in the memory 12 by the CPU 11 and displayed on the display unit 15 (e.g., display screen). Incidentally, the display unit 15 of the power generation amount prediction apparatus 10 may also be just a simple screen used exclusively for rewriting control programs and databases.

In the power generation amount prediction apparatus 10, roughly eleven databases DB are stored. The following explanation of the databases DB will be given of the power generation amount predictive calculation input database DB20 excluding the program database DB50 (i.e., the weather prediction database DB21, the weather track record database DB22, the renewable energy output power track record database DB23, the renewable energy characteristic database DB24 and the renewable energy installation condition database DB25) and the power generation amount predictive calculation result database DB40 (i.e., the renewable energy model generation result database DB41, the similar track record data extraction result database DB42, the renewable energy model accuracy calculation result database DB43, the renewable energy model selection result database DB44 and the renewable energy output power prediction result database DB45).

First, as shown in FIG. 4, the weather prediction database DB21 stores the weather prediction data D21 such as wind direction (D213), wind speed (D214) and insolation (D215) in regard to each date (D210) and each point (D211) in terms of a time series (D212) of future time points. The time span of the time-series data may be in any unit of time such as day, month or year depending on the time as the target of the prediction. Increasing the data volume increases the prediction accuracy while also leading to an increase in the number of calculations, and thus it is desirable that the calculation time be changeable depending on the time span of the prediction target and desired accuracy of the prediction target. As the weather prediction data D21, information on predicted weather specially obtained from the Meteorological Agency or the like or obtained by independently conducting analysis is stored.

As shown in FIG. 5, the weather track record database DB22 stores the weather track record data D22 such as wind direction (D223), wind speed (D224) and insolation (D225) in regard to each date (D220) and each point (D221) in terms of a time series (D222) of past time points. The time span of the time-series data may be in any unit of time such as day, month or year depending on the time as the target of the prediction. Increasing the data volume increases the prediction accuracy while also leading to an increase in the number of calculations, and thus it is desirable that the calculation time be changeable depending on the time span of the prediction target and desired accuracy of the prediction target.

As shown in FIG. 6, the renewable energy output power track record database DB23 stores the renewable energy output power track record data D23 such as output power data of each power generation site (D233, D234, D235) such as a wind power plant or a photovoltaic power plant in regard to each date (D230) and each point (D231) in terms of a time series (D232). In the illustrated example, WTA1, WTA2 and WTB1 are shown as examples of wind power plants and PVA1, PVB1 and PVB2 are shown as examples of photovoltaic power plants. The span of the time-series data may be in any unit of time such as day, month or year depending on the time as the target of the prediction. Increasing the data volume increases the prediction accuracy while also leading to an increase in the number of calculations, and thus it is desirable that the calculation time be changeable depending on the time span of the prediction target and desired accuracy of the prediction target.

Figure 7:
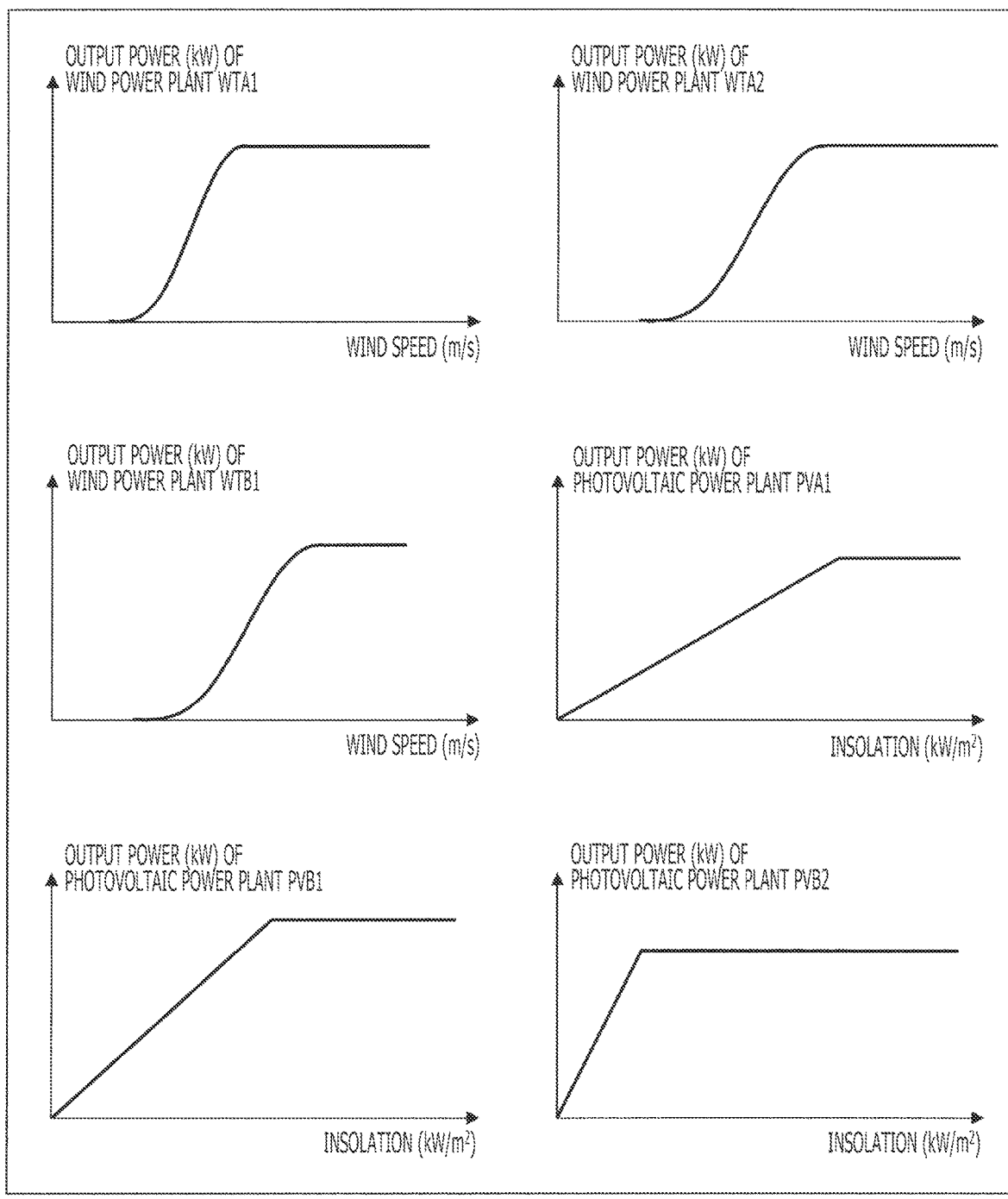
FIG. 7 is a diagram showing an example of renewable energy characteristic data D24 stored in a renewable energy characteristic database DB24.

As shown in FIG. 7, the renewable energy characteristic database DB24 stores the renewable energy characteristic data such as output power curves with respect to the wind speed in regard to the wind power plants WTA1, WTA2 and WTB1 and output power curves with respect to the insolation in regard to the photovoltaic power plants PVA1, PVB1 and PVB2.

As shown in FIG. 8, the renewable energy installation condition database DB25 stores the renewable energy installation condition data such as the installation point, the installation direction and the landform at the installation point in regard to each power generation site such as the wind power plants WTA1, WTA2 and WTB1 and the photovoltaic power plants PVA1, PVB1 and PVB2.

In the power generation amount predictive calculation result database DB40 shown in FIG. 1, the renewable energy model generation result database DB41 stores the renewable energy model generation result data generated by the renewable energy model generation program P51 by use of the weather track record data D22, the renewable energy output power track record data D23, the renewable energy characteristic data D24 and the renewable energy installation condition data D25.

The renewable energy model generated here is a model represented by a numerical expression like those shown in FIG. 13. The model is represented by a numerical expression in regard to each of the wind power plants WTA1, WTA2 and WTB1 and the photovoltaic power plants PVA1, PVB1 and PVB2 as in the example shown in FIG. 13. To explain the meaning of each variable in the numerical expression by using the (k−1)-th model of the wind power plant WTA1 as an example, y(j) represents the output power of the model at the time j, u(j) represents the input to the model at the time j, w(j) represents external disturbance to the model at the time j, q represents a differential operator or shift operator, $G^{WTA1}_{k-1}(q)$ represents a transfer function from the input u(j) to the output power y(j) of the wind power plant WTA1 at the model generation time k−1, and $H^{WTA1}_{k-1}(q)$ represents a transfer function from the external disturbance w(j) to the output power y(j) of the wind power plant WTA1 at the model generation time k−1.

More specifically and ideologically, the renewable energy model generated here is a secondary model obtained by previously generating a primary mathematical model of each power generation site based on the relationship between the past weather condition (FIG. 5, D22) and the power generation output power at that time (FIG. 6, D23) in regard to the power generation site and correcting the primary mathematical model by adding the installation condition (FIG. 8, D25) and the characteristic condition (FIG. 7, D24) of the site to the primary mathematical model. Incidentally, the model is set in regard to a plurality of model generation times (k−1, k−2, k−3, etc.) since the model fluctuates depending on the weather condition and the time/season and cannot be defined uniformly at all times.

Such a renewable energy model increases in the number of models and an elaborate model is gradually formed by experiencing a plurality of model generation times (k−1, k−2, k−3, etc.) while accumulating the track record of each power generation site. Incidentally, details of the method of generating the renewable energy model will be described later.

The similar track record data extraction result database DB42 stores the similar track record data extraction result data obtained by the extraction by the similar track record data extraction program P52 by use of the weather prediction data D21, the weather track record data D22 and the renewable energy output power track record data D23. More specifically, in regard to a weather condition that is expected to appear in the near future such as today or tomorrow (weather prediction data D21), whether a similar weather condition exists in past weather conditions (weather track record data D22) or not is judged. If there exists a similar weather condition, what kind of weather condition it was is recognized, the renewable energy output power at that time (renewable energy output power track record data D23) is searched for and extracted, and similar data is extracted as the similar track record data. This extraction is conducted for each power generation site. Details of the method of extracting the similar track record data will be described later.

The renewable energy model accuracy calculation result database DB43 stores renewable energy model accuracy calculation result obtained by the calculation by the renewable energy model accuracy calculation program P53 by use of the renewable energy model generation result data D41, the similar track record data extraction result data D42 and the renewable energy model selection result data D44. In more detail, the renewable energy model accuracy calculation result is obtained by performing the model accuracy calculation on the plurality of models of each site (D41) shown in FIG. 13 in the similar track record data extracted based on the future weather.

Incidentally, in performing the model accuracy calculation, when a weather condition not yet experienced by the wind power plant WTA1 such as an extreme weather condition is predicted, if such a weather condition is already experienced by the wind power plant WTA2, it is desirable to perform the accuracy calculation by employing even the experience information on a different power generation site (wind power plant WTA2) for the prediction of the wind power plant WTA1. Such employment is effective in situations like making up for little experience at a new power generation site by incorporating a track record at another power generation site having a lot of experience.

Figure 14:
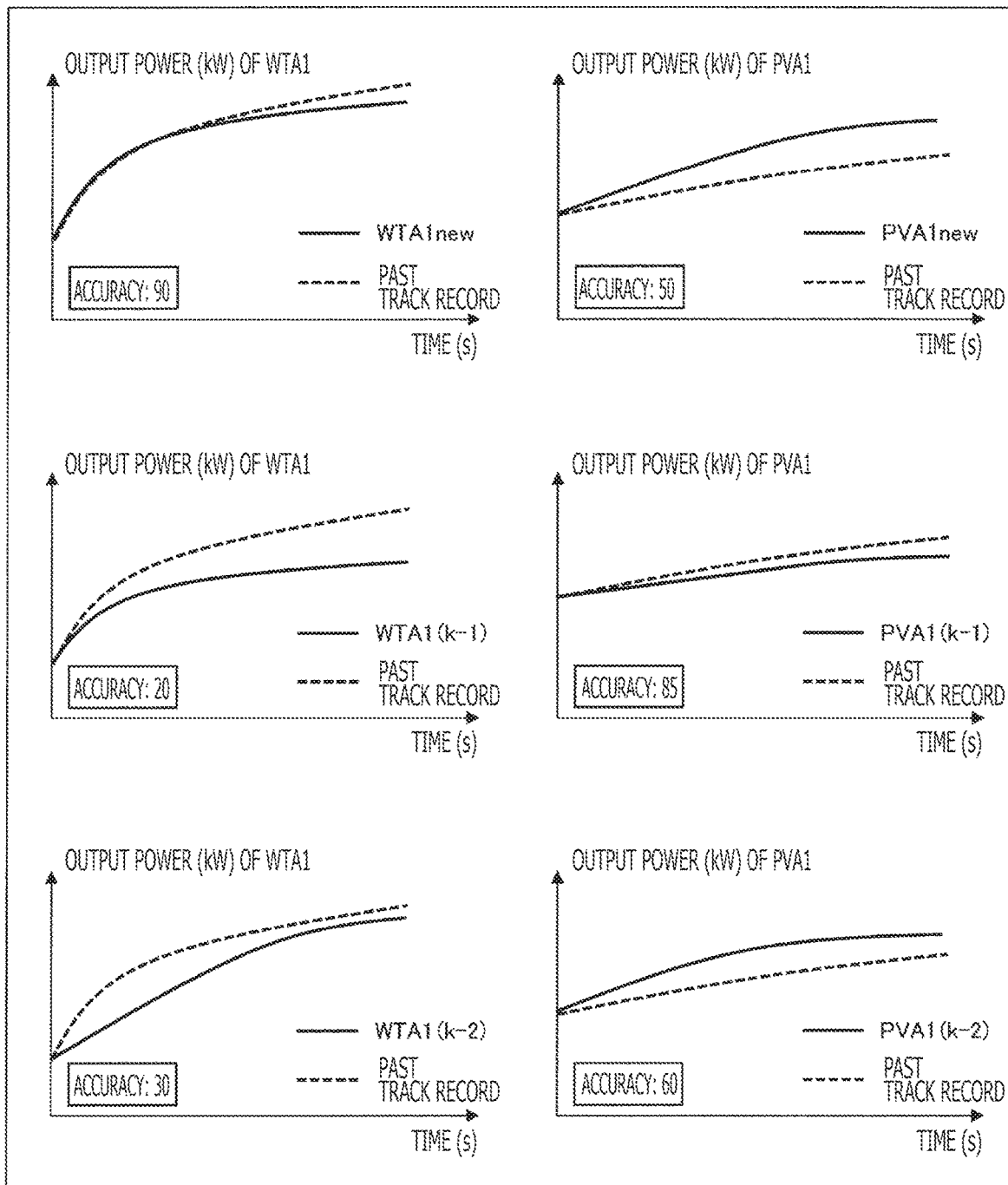
FIG. 14 is a diagram showing an example of a renewable energy model accuracy calculation result.

FIG. 14 shows an example of the result of the accuracy evaluation. The accuracy evaluation is made based on the difference between the output power of the model of each of the wind power plants WTA1, WTA2 and WTB1 and the photovoltaic power plants PVA1, PVB1 and PVB2 (solid line) and the output power calculated by use of the similar weather track record data extracted based on the future weather. The result shown in FIG. 14 indicates that high accuracy is achieved by the newest model in regard to the wind power plant WTA1 and the model generated at the time k−1 in regard to the photovoltaic power plant PVA1 but models generated at other times cannot achieve high accuracy. Details of the method of the renewable energy model accuracy calculation will be described later.

The renewable energy model selection result database DB44 stores the renewable energy model selection result data obtained by the selection made by the renewable energy model selection program P54 by use of the renewable energy model accuracy calculation result data D43. For example, in cases where k−1 in FIG. 13 achieved the highest accuracy in regard to the wind power plant WTA1 as the result of the model accuracy calculation, the model corresponding to k−1 is selected. Details of the method of the renewable energy model selection will be described later.

Figure 15:
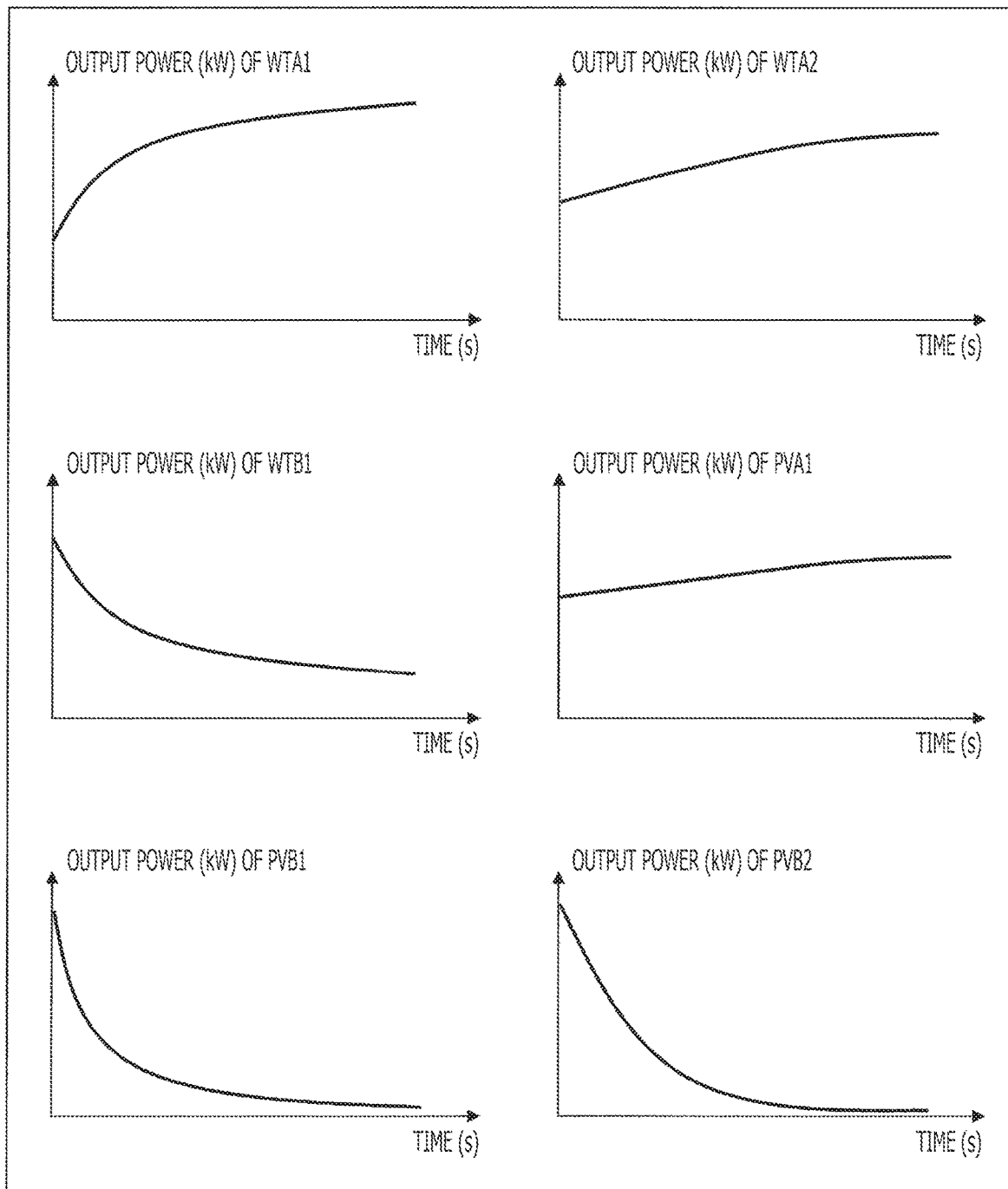
FIG. 15 is a diagram showing an example of a renewable energy output power prediction result.

The renewable energy output power prediction result database DB45 stores the renewable energy output power prediction result obtained by the calculation by the renewable energy output power prediction program P55 by use of the weather prediction data D21 and the renewable energy model selection result data D44. The renewable energy output power prediction result is obtained by estimating the output power in terms of a time series by applying the time-series weather condition in the weather prediction data D21 to the numerical expression of the model of the wind power plant WTA1 at k−1 in FIG. 13. Similar processing is applied also to other power plants. FIG. 15 shows time-series output power prediction result of each power generation site obtained as above. Details of the method of the renewable energy output power prediction will be described later.

Figure 9:
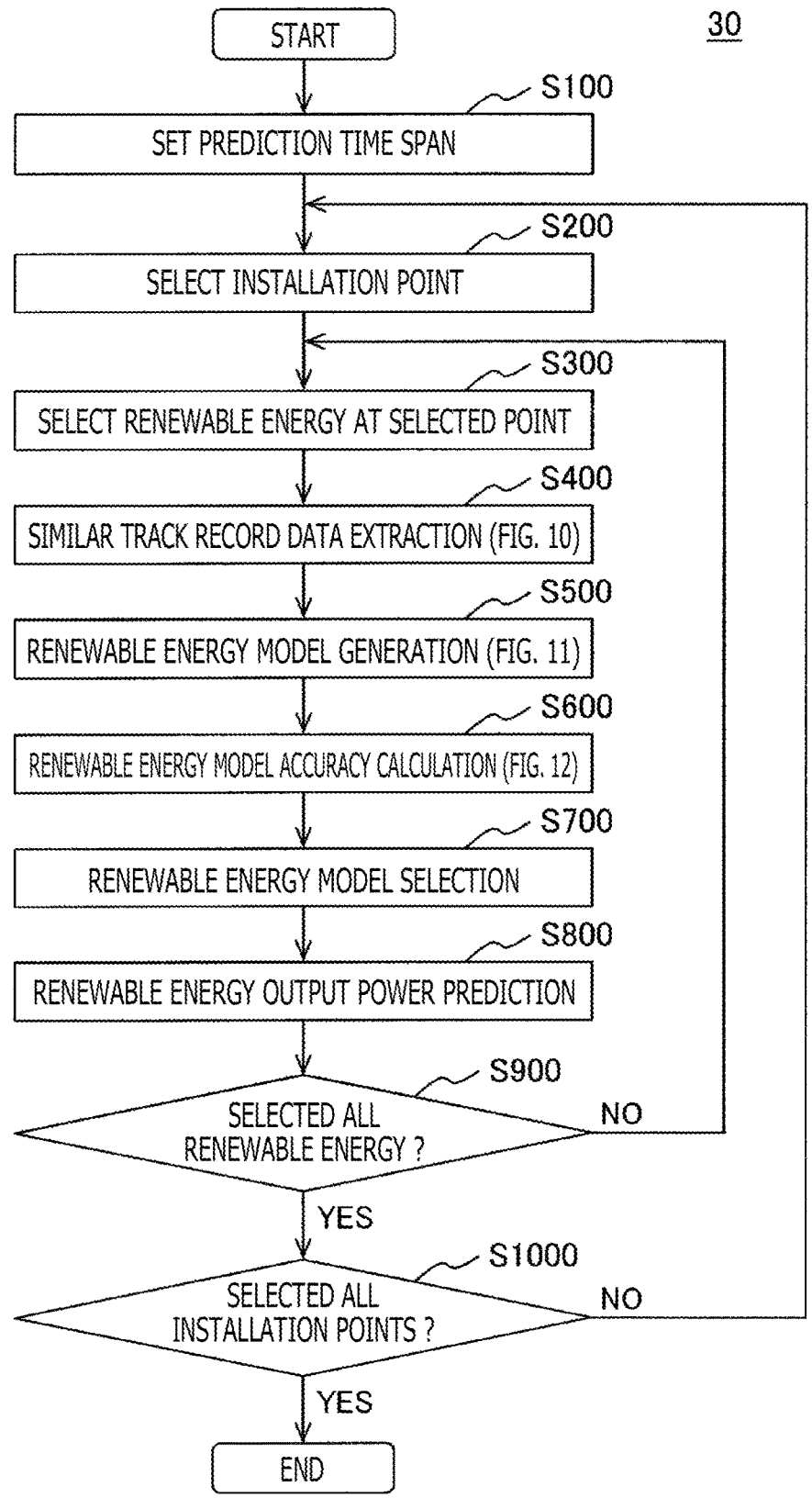
FIG. 9 is a flow chart showing an example of details of arithmetic processing performed by the power generation amount prediction apparatus.

Next, an example of details of arithmetic processing performed by the power generation amount prediction apparatus 10 will be described below with reference to FIG. 9. FIG. 9 is an example of a flowchart showing the whole of the processing performed by the power generation amount prediction apparatus 10. The flow of the processing will be described below.

First, in processing step S100, the time span of the renewable energy output power prediction is set.

In processing step S200, a renewable energy installation point as the output power prediction target is selected.

In processing step S300, renewable energy as the output power prediction target at the selected point is selected.

In processing step S400, weather track record data similar to the weather prediction data and renewable energy output power track record data at the time of the weather are extracted by using the weather prediction data D21, the weather track record data D22 and the renewable energy output power track record data D23, and the result of the extraction is stored in the similar track record data extraction result database DB42.

Figure 10:
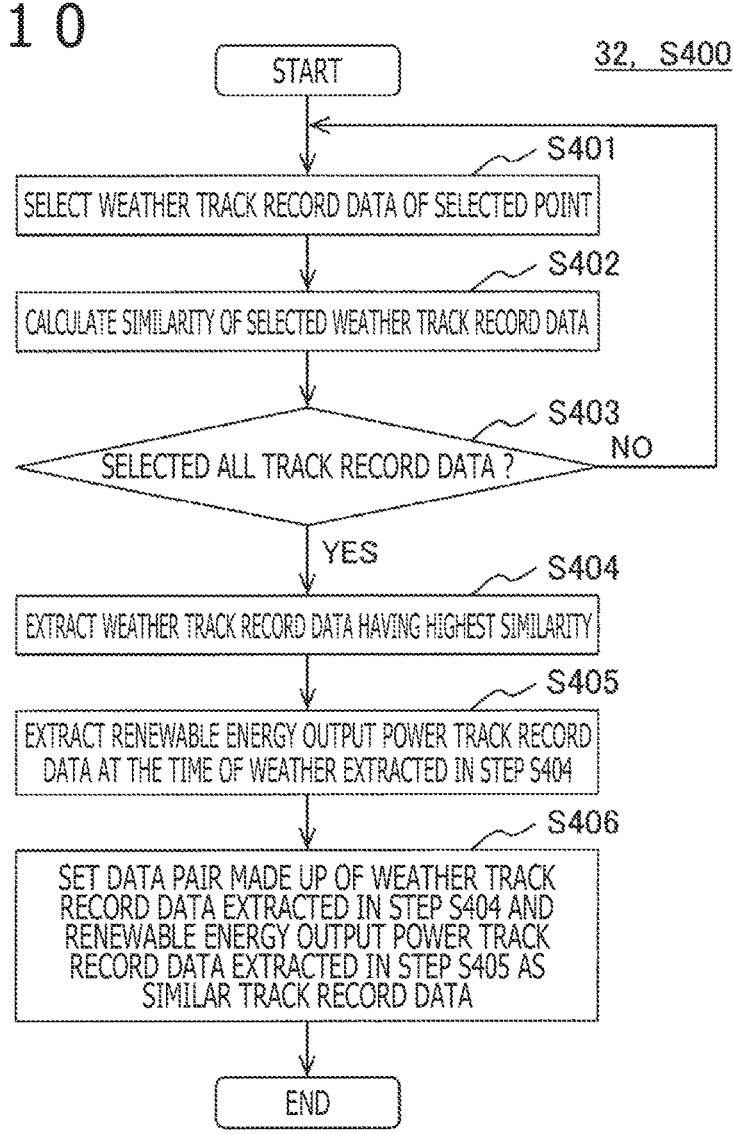
FIG. 10 is a detailed flow chart of processing step S400 in FIG. 9.

Here, the flow of the similar track record data extraction in the processing step S400 in FIG. 9 will be explained in more detail with reference to FIG. 10. FIG. 10 is an example of a flow chart for explaining the processing by the similar track record data extraction unit 32 in FIG. 1. In processing step S401, the weather track record data of the point selected in the processing step S200 is selected by using the selection result of the processing step S200 and the weather track record data D22.

In processing step S402, the similarity between the weather prediction data and the weather track record data selected in the processing step S401 is calculated by using the weather prediction data D21 and the selection result of the processing step S401. The similarity calculation is carried out according to a method like a calculation method described in Berndt, D. & Clifford, J., "Using dynamic time warping to find patterns in time series," AAAI-94 Workshop on Knowledge Discovery in Databases, for example.

In processing step S403, whether all weather track record data of the point selected in the processing step S200 have been selected or not is judged. If not all weather track record data of the point selected in the processing step S200 have been selected, the process returns to the processing step S401. If all weather track record data of the point selected in the processing step S200 have been selected, the process advances to processing step S404.

In the processing step S404, weather track record data having the highest similarity is extracted by using the calculation result of the processing step S402 and the renewable energy output power track record data D23.

In processing step S405, renewable energy output power track record data at the time of the weather extracted in the processing step S404 is extracted by using the extraction result of the processing step S404 and the renewable energy output power track record data D23.

In processing step S406, a data pair made up of the weather track record data extracted in the processing step S404 and the renewable energy output power track record data extracted in the processing step S405 is set as the similar track record data by using the extraction result of the processing step S404 and the extraction result of the processing step S405. With the above processing steps, data most similar to the weather prediction data can be extracted at high speed from the great amount of weather track record data.

Returning to FIG. 9, in processing step S500, a model of the renewable energy is generated by using the weather track record data D22, the renewable energy output power track record data D23, the renewable energy characteristic data D24 and the renewable energy installation condition data D25, and the result of the generation is stored in the renewable energy model generation result database DB41.

Figure 11:
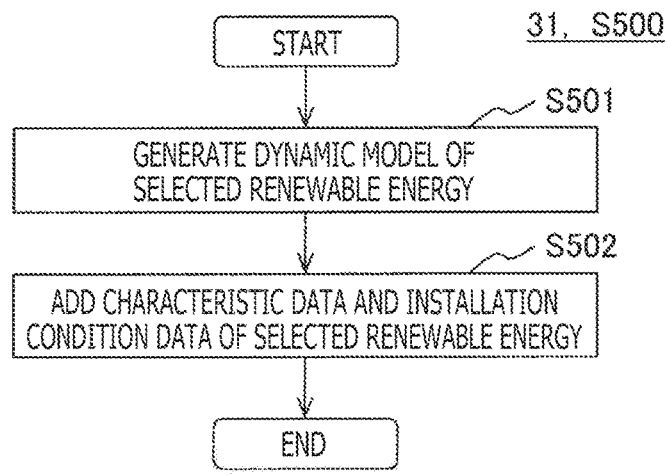
FIG. 11 is a detailed flow chart of processing step S500 in FIG. 9.

Here, the flow of the renewable energy model generation in the processing step S500 in FIG. 9 will be explained with reference to FIG. 11. In processing step S501, a mathematical model of the renewable energy selected in the processing step S300 is generated by using the selection result of the processing step S300, the weather track record data D22 and the renewable energy output power track record data D23. The mathematical model is generated according to a method like a generation method described in Shuichi Adachi, "Basics of System Identification," Tokyo Denki University Press, 2009, for example. Here, if there exists no output power track record data of the renewable energy selected in the processing step S300, it is determined that there is no model.

In processing step S502, the renewable energy characteristic data D24 and the renewable energy installation condition data D25 of the same renewable energy are added to the mathematical model of the renewable energy generated in the processing step S501 by using the generation result of the processing step S501, the renewable energy characteristic data D24 and the renewable energy installation condition data D25.

Here, when no model was generated in the processing step S501, only the corresponding renewable energy characteristic data D24 and renewable energy installation condition data D25 are stored in the renewable energy model generation result database DB41. With the above steps, a model can be defined even for renewable energy for which no track record exists. Accordingly, the number of types of renewable energy for which the output power prediction is possible can be increased.

Returning to FIG. 9, in processing step S600, accuracy of the renewable energy model generated in the processing step S500 and the renewable energy model included in the renewable energy selection result data is calculated by using the extraction result of the processing step S400, the generation result of the processing step S500 and the renewable energy model selection result data D44, and the result of the calculation is stored in the renewable energy model accuracy calculation result database DB43.

Figure 12:
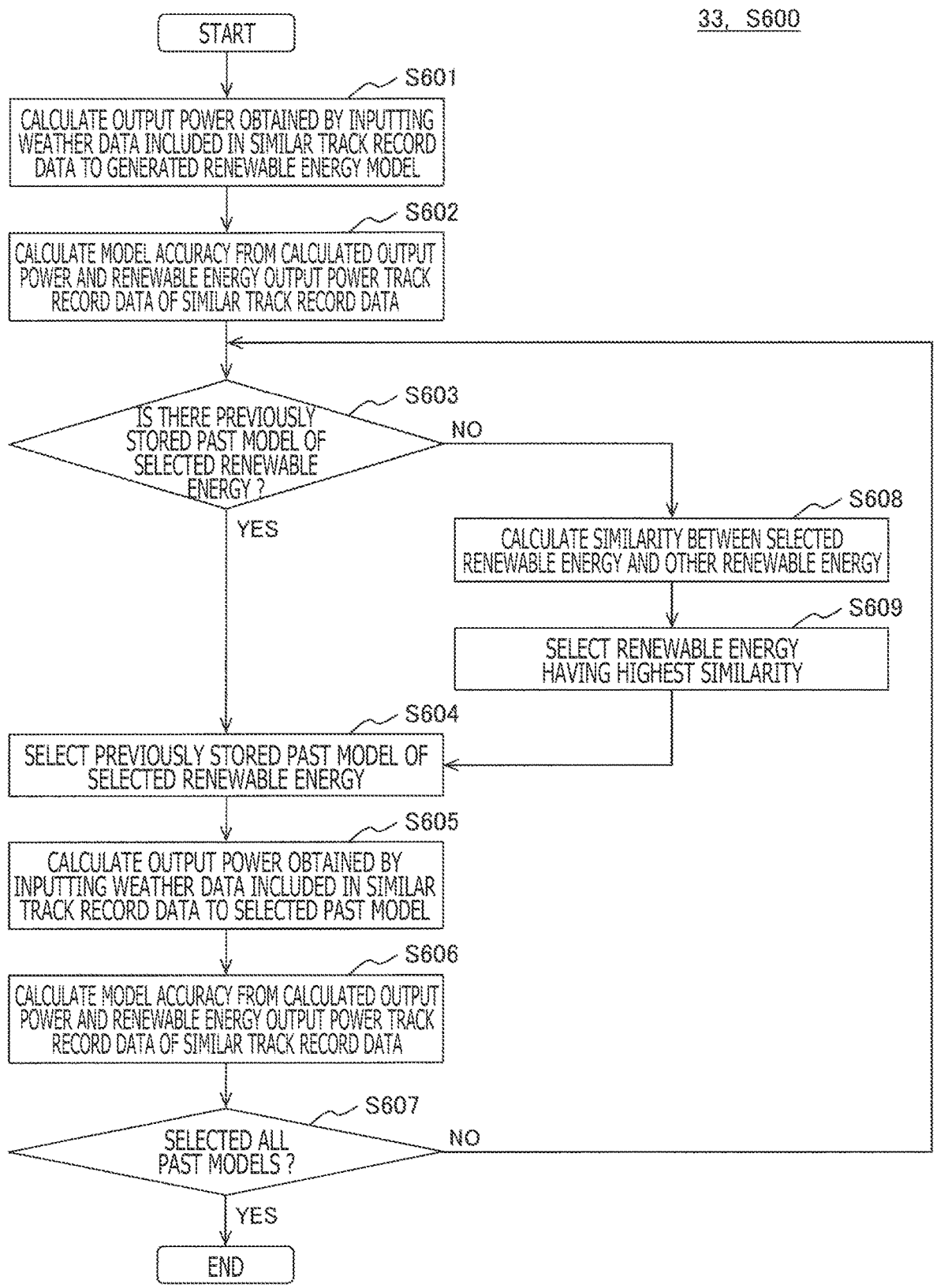
FIG. 12 is a detailed flow chart of processing step S600 in FIG. 9.

Here, the flow of the renewable energy model accuracy calculation will be explained with reference to FIG. 12. In processing step S601, output power obtained by inputting the weather track record data included in the similar track record data extracted in the processing step S400 to the renewable energy model generated in the processing step S500 is calculated by using the generation result of the processing step S500 and the extraction result of the processing step S400.

In processing step S602, accuracy is calculated by comparing the output power of the renewable energy model calculated in the processing step S601 with the renewable energy output power track record data paired with the weather track record data inputted in the processing step S601 by using the calculation result of the processing step S601 and the extraction result of the processing step S400.

The model accuracy calculation is performed by using similarity described in the following literature as the accuracy, for example: Berndt, D. & Clifford, J., "Using dynamic time warping to find patterns in time series," AAAI-94 Workshop on Knowledge Discovery in Databases.

In processing step S603, whether there exists a previously stored renewable energy model corresponding to the renewable energy selected in the processing step S300 or not is judged by using the selection result of the processing step S300 and the renewable energy model selection result data D44. If there exists such a renewable energy model, the process advances to processing step S604. Otherwise, the process advances to processing step S608.

In processing step S605, output power obtained by inputting the weather track record data included in the similar track record data extracted in the processing step S400 to the previously stored renewable energy model corresponding to the renewable energy selected in the processing step S300 or S609 is calculated by using the selection result of the processing step S300 or S609, the renewable energy model selection result data D44 and the extraction result of the processing step S400.

In processing step S606, accuracy is calculated by comparing the output power of the renewable energy model calculated in the processing step S605 with the renewable energy output power track record data paired with the weather track record data inputted in the processing step S605 by using the calculation result of the processing step S605 and the extraction result of the processing step S400.

In processing step S607, whether all renewable energy models of the renewable energy selected in the processing step S300 have been selected or not is judged by using the selection result of the processing step S300 and the renewable energy model selection result data D44. If not selected, the process returns to the processing step S603. If selected, the process ends.

In the processing step S608, similarity between the renewable energy selected in the processing step S300 and the renewable energy stored in the renewable energy model selection result data D44 is calculated by using the selection result of the processing step S300 and the renewable energy model selection result data D44.

The method of the similarity calculation is as follows, for example: Based on the renewable energy installation condition of the renewable energy selected in the processing step S300 and the renewable energy installation condition of the renewable energy model stored in the renewable energy model selection result data D44, renewable energy having the same installation condition as the renewable energy selected in the processing step S300 is extracted, and similarity between the renewable energy characteristic of the extracted renewable energy and the renewable energy characteristic of the renewable energy selected in the processing step S300 is calculated.

The calculation of the similarity is carried out according to a method like the calculation method described in Berndt, D. & Clifford, J., "Using dynamic time warping to find patterns in time series," AAAI-94 Workshop on Knowledge Discovery in Databases, for example.

In the processing step S609, other renewable energy having the highest similarity is selected by using the calculation result of the processing step S608. With the above steps, a model having a dynamic characteristic can be defined for all types of renewable energy as the prediction targets. Accordingly, the output power of each of all types of renewable energy as the prediction targets can be predicted in regard to any weather prediction data.

With this process, even when a power generation site A does not have sufficient track record data because of its recency or the like, if another similar power generation site B already has experience, the lack of experience of the power generation site A can be compensated for by employing the experience of the power generation site B for the model of the power generation site A.

Returning to FIG. 9, in processing step S700, a renewable energy model having the highest accuracy is selected by using the calculation result of the processing step S600. Accordingly, the number of models used for the output power prediction decreases, by which the number of calculations necessary for the prediction can be reduced.

In processing step S800, the renewable energy output power prediction is calculated by inputting the weather prediction data to the renewable energy model selected in the processing step S700 by using the selection result of the processing step S700 and the weather prediction data D21. Accordingly, renewable energy output power prediction corresponding to the span and interval of the time-series data of the weather prediction data can be calculated. For example, by setting the span and interval of the time-series data of the weather prediction data to be respectively long and short, the renewable energy output power in a long time period can be predicted at short intervals.

In processing step S900, it is judged whether all types of renewable energy as output power prediction targets at the installation point selected in the processing step S200 have been selected or not by using the selection results of the processing steps S200 and S300. If selected, the process advances to processing step S1000. If not selected, the process returns to the processing step S300.

In the processing step S1000, whether all the renewable energy installation points Sas output power prediction targets have been selected or not is judged by using the selection result of the processing step S200. If not selected, the process returns to the processing step S200. If selected, the process ends.

With the above steps, the output power of renewable energy can be predicted with high accuracy. Various calculation results obtained as above and data accumulated in the memory in the middle of calculation may be successively displayed on the screen of the monitoring control device 200. Accordingly, the operator can easily grasp the operating status of the power generation amount prediction apparatus 10.

Figure 16:
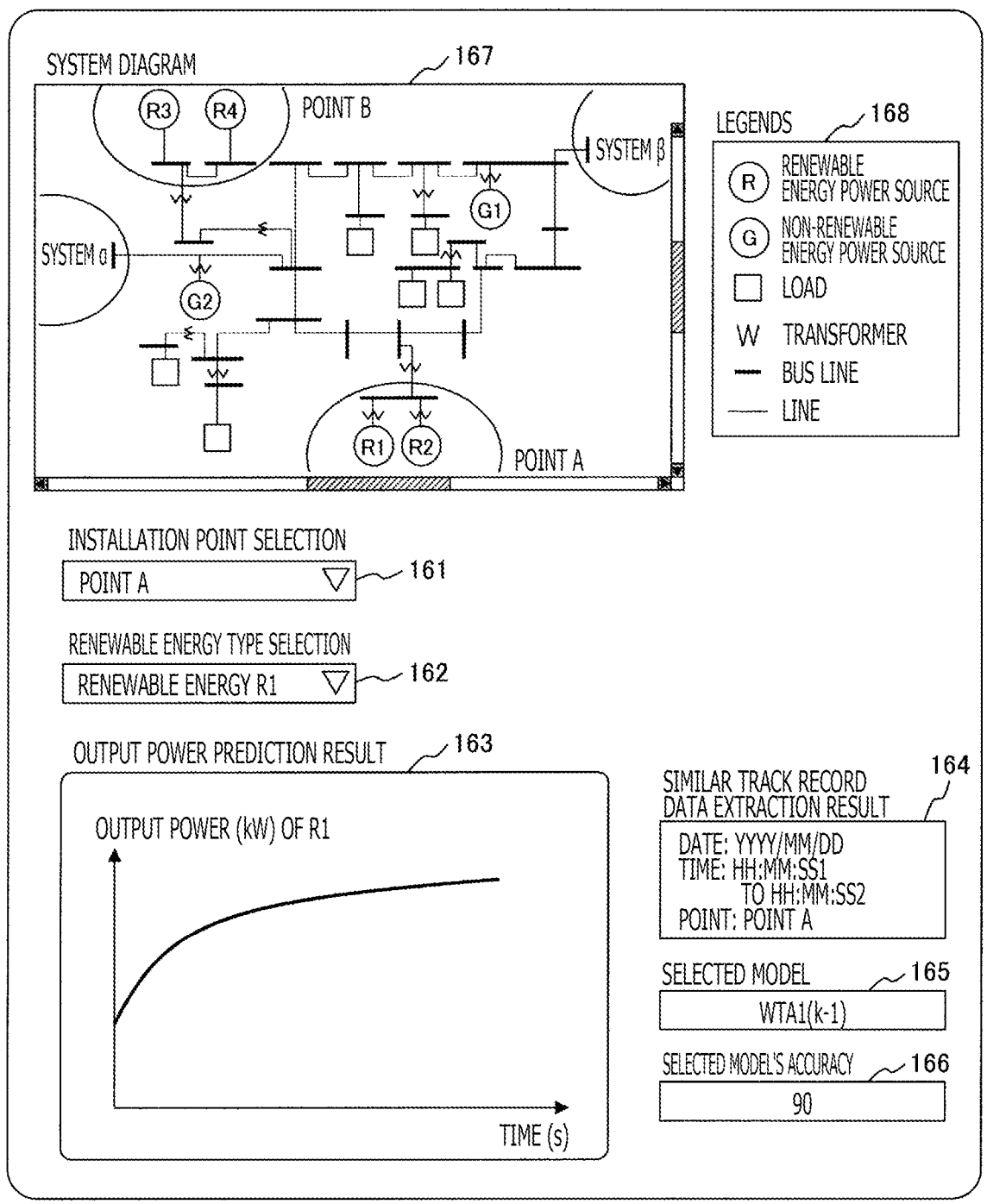
FIG. 16 is a diagram showing a screen display example of the power generation amount prediction apparatus.

Here, an example of a specific display content will be described with reference to FIG. 16. In FIG. 16, a renewable energy installation point 161 as an output power prediction target, a renewable energy type 162, an output power prediction result 163, a similar track record data extraction result 164, a renewable energy model selection result 165 and a renewable energy model accuracy calculation result 166 are displayed on the display screen as the result of the similar track record data extraction, the renewable energy model generation, the renewable energy model accuracy calculation, the renewable energy model selection and the renewable energy output power prediction. This display is made in a display format easily understandable to the user by also displaying a system diagram 167 and legends 168.

By displaying the renewable energy output power prediction result on the screen of the monitoring control device 200 as shown in FIG. 16 via the power generation amount prediction apparatus 10 and the communication network 300, an effect is achieved in that the operator can grasp at a glance what kind of output power prediction has been made for what type of renewable energy in the electric power system 100.

Further, when there exist multiple types of renewable energy as the output power prediction targets, it is possible to select the renewable energy installation point 161 and the renewable energy type 162 and thereby check the output power prediction result, the similar track record data extraction result, the renewable energy model selection result and the renewable energy model accuracy calculation result of the selected renewable energy.

In the above-described power generation amount prediction apparatus of the first embodiment, a renewable energy model is generated based on the weather track record data D22, the renewable energy output power track record data D23, the renewable energy characteristic data D24 and the renewable energy installation condition data D25. Weather track record data similar to the weather prediction data and renewable energy output power track record data at the time of the weather are extracted based on the weather prediction data D21, the weather track record data D22, the renewable energy output power track record data D23, the renewable energy characteristic data D24 and the renewable energy installation condition data D25. The accuracy of the renewable energy model is calculated based on the renewable energy model generation result data D41, the similar track record data extraction result data D42 and the renewable energy model selection result data D44. The renewable energy model to be used for the output power prediction is selected based on the renewable energy model accuracy calculation result data D43. The renewable energy output power is predicted based on the renewable energy model selection result data D44 and the weather prediction data D21. The result of the prediction and each calculation result are displayed.

Further, in the first embodiment, the power generation amount prediction system is formed by employing the power generation amount prediction apparatus 10 for an electric power system.

Second Embodiment

In the first embodiment, the description was given of the power generation amount prediction apparatus 10. This apparatus operates only to make the prediction and display the prediction on a screen or the like, without positively contributing to subsequent control or the like. In a second embodiment, a description will be given of an example of utilizing the power generation amount prediction apparatus later for the control of the electric power system and thereby constructing a system stabilization apparatus for stabilizing the system with high accuracy upon the occurrence of a failure.

Specifically, in the second embodiment, a system stabilization apparatus that stabilizes a system with high accuracy upon the occurrence of a failure by predicting a system condition with a system condition prediction unit 36 and determining a control target with a control target determination unit 37 is formed by using the power generation amount prediction apparatus 10 in the first embodiment, the renewable energy output power prediction result data D45, system condition data D26 and system model data D27.

Figure 17:
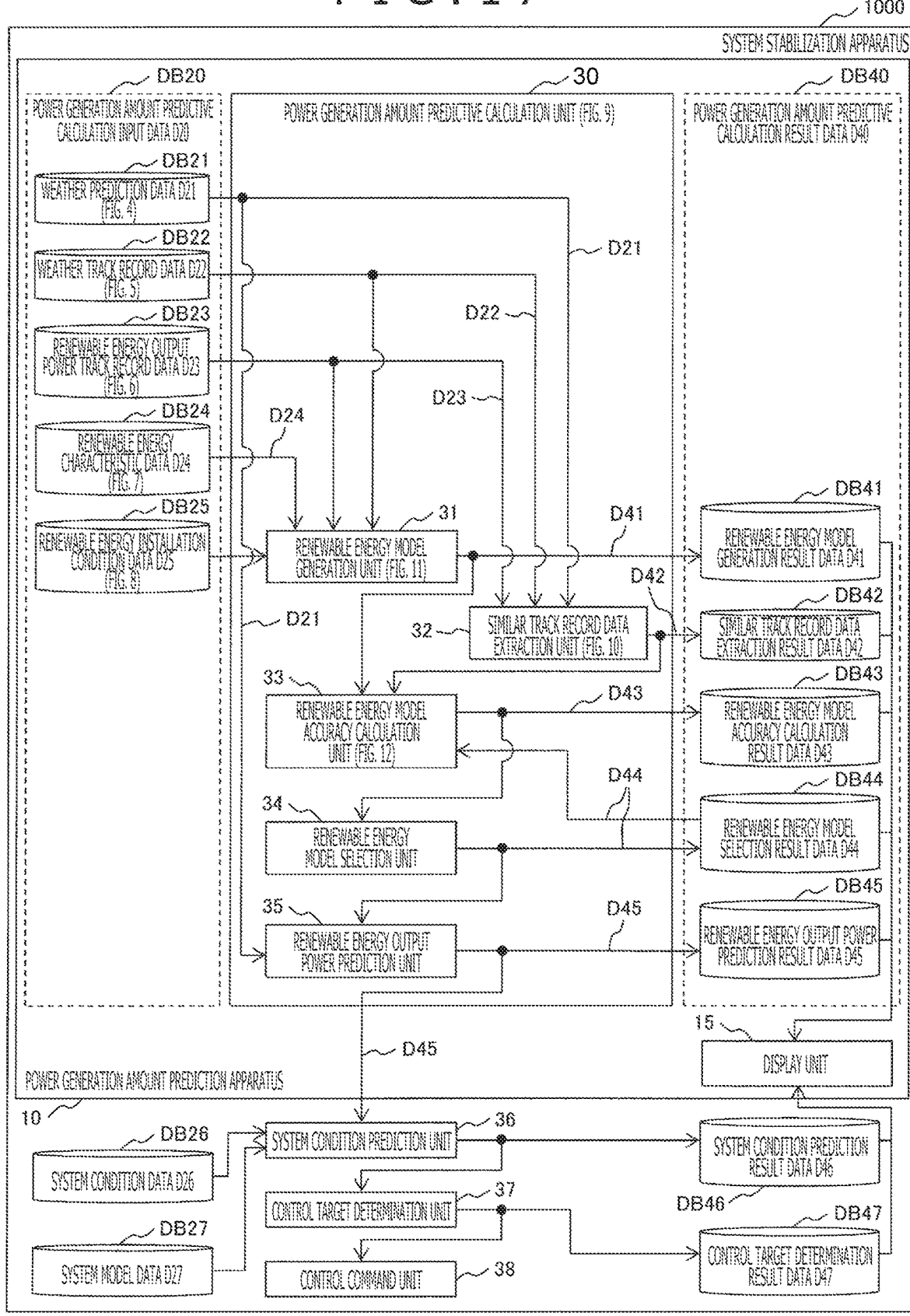
FIG. 17 is a diagram showing an example of the overall configuration of a system stabilization apparatus according to a second embodiment.

FIG. 17 shows an example of the system stabilization apparatus according to the second embodiment. Here, the power generation amount prediction apparatus 10 itself is totally the same as that shown in FIG. 1, and databases and processing function units described below are provided in addition.

The system stabilization apparatus 1000 shown in FIG. 17 is formed by additionally providing the power generation amount prediction apparatus 10 of FIG. 1 with a system condition database DB26, a system model database DB27, a system condition prediction result database DB46 and a control target determination result database DB47 as databases DB. Further, a system condition prediction unit 36, a control target determination unit 37 and a control command unit 38 are additionally provided as processing function units.

Accordingly, input data of the system stabilization apparatus 1000 include system condition data D26 and system model data D27 in addition to the weather prediction data D21, the weather track record data D22, the renewable energy output power track record data D23, the renewable energy characteristic data D24 and the renewable energy installation condition data D25.

Further, result data of the system stabilization apparatus 1000 include system condition prediction result data D46 and control target determination result data D47 in addition to the renewable energy model generation result data D41, the similar track record data extraction result data D42, the renewable energy model accuracy calculation result data D43, the renewable energy model selection result data D44 and the renewable energy output power prediction result data D45.

The functions of the power generation amount prediction apparatus 10 have already been described earlier, and thus detail description thereof is omitted here. The system condition prediction unit 36 newly added as a component of the system stabilization apparatus 1000 predicts the system condition by using the renewable energy output power prediction result data D45, the system condition data D26 and the system model data D27 and outputs the system condition prediction result data D46. The system condition prediction result data D46 is stored and held in the system condition prediction result database DB46.

The control target determination unit 37 of the system stabilization apparatus 1000 determines the control target for the system stabilization when deterioration in the system condition is predicted by using the system condition prediction result data D46 and outputs the control target determination result data D47. The control target determination result data D47 is stored and held in the control target determination result database DB47.

The control command unit 38 of the system stabilization apparatus 1000 transmits a control command to the control target by using the control target determination result data D47. The display unit 15 of the system stabilization apparatus 1000 displays information on each calculation result by using the power generation amount predictive calculation result data D40, the system condition prediction result data D46 and the control target determination result data D47.

Figure 18:
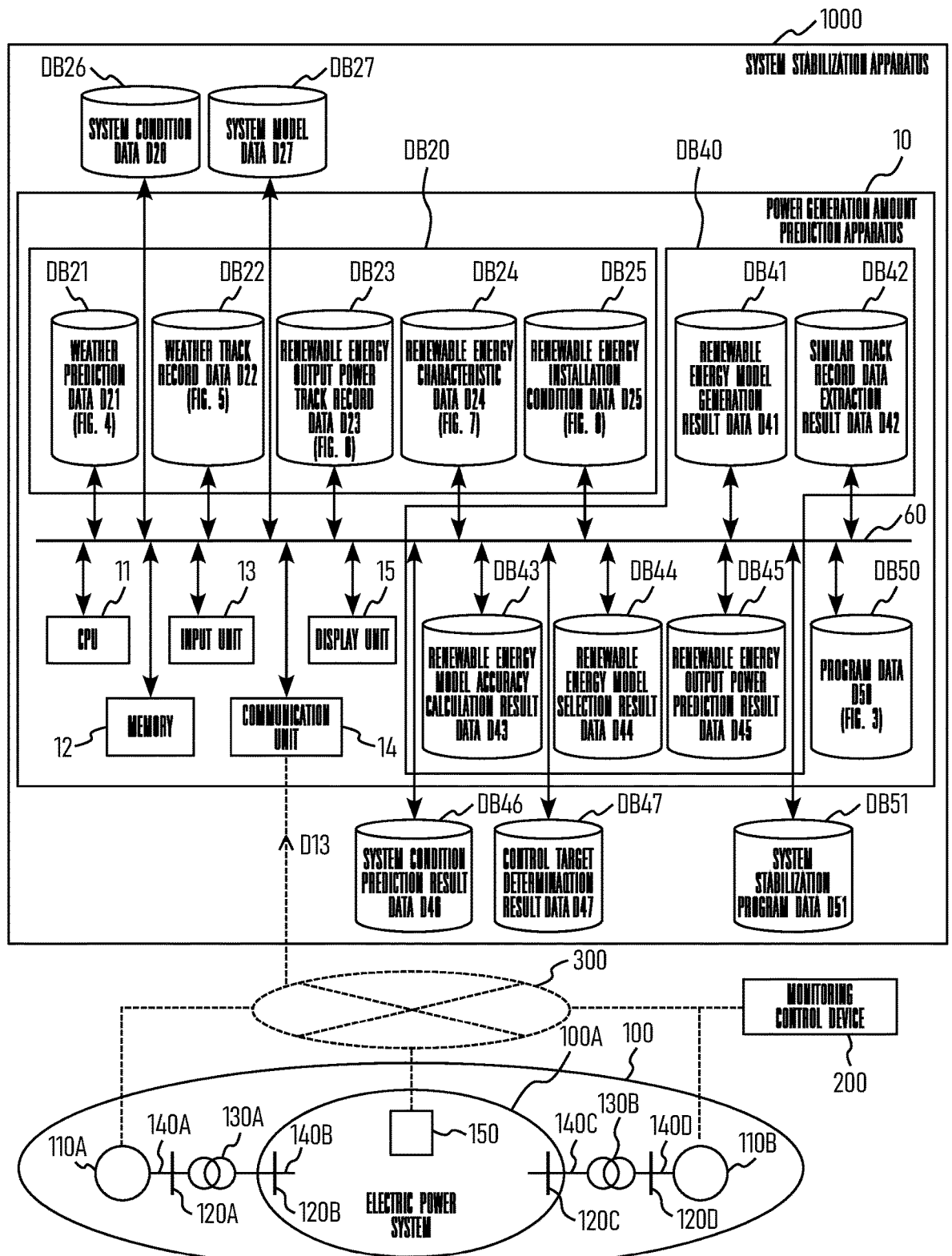
FIG. 18 is a diagram showing an example of the overall configuration of a system stabilization system in a case where the system stabilization apparatus of FIG. 17 is employed for an electric power system.

FIG. 18 shows an example of the hardware configuration of the system stabilization apparatus 1000 in the second embodiment and a system overall configuration diagram of the electric power system 100. In FIG. 18, the system condition database DB26, the system model database DB27, the system condition prediction result database DB46, the control target determination result database DB47 and a system stabilization program database DB51 are additionally provided and connected to the bus line 60 in the overall configuration diagram of the power generation amount prediction apparatus 10 and the electric power system 100 in the first embodiment shown in FIG. 2. Explanation is omitted for components in FIG. 18 having the same function as an already-explained component shown in FIG. 2 with the same reference character.

Figure 19:
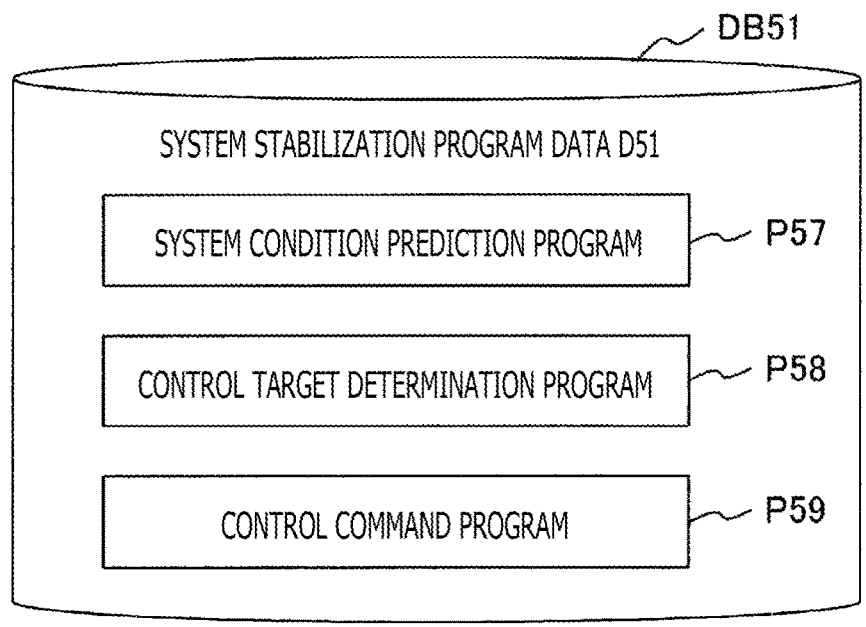
FIG. 19 is a diagram showing the contents of system stabilization program data of the system stabilization apparatus.

Next, memory contents of the system stabilization program database DB51 will be explained with reference to FIG. 19. FIG. 19 is an example of a configuration diagram showing the contents of system stabilization program data D51 of the system stabilization apparatus 1000. The system stabilization program database DB51 stores a system condition prediction program P57, a control target determination program P58 and a control command program P59, for example.

Returning to FIG. 18, the CPU 11 executes arithmetic programs loaded from the program database DB50 and the system stabilization program database DB51 into the memory 12 (the renewable energy model generation program P51, the similar track record data extraction program P52, the renewable energy model accuracy calculation program P53, the renewable energy model selection program P54, the renewable energy output power prediction program P55, the system condition prediction program P57, the control target determination program P58, the control command program P59 and the display program P56) and thereby carries out the generation of the renewable energy model, the extraction of the similar track record data, the calculation of the renewable energy model accuracy, the selection of the renewable energy model, the prediction of the renewable energy output power, the prediction of the system condition, the determination of the control target, the transmission of the control commands, the commanding of image data to be displayed, the search for data in various databases, and so forth.

In the system stabilization apparatus 1000, roughly sixteen databases DB are stored. The following explanation of the databases DB will be given of the newly added system condition database DB26, system model database DB27, system condition prediction result database DB46 and control target determination result database DB47 while omitting the explanation of the already explained databases.

First, the system condition database DB26 stores active power P, reactive power Q, voltage V, voltage phase angle δ, current I, a power factor Φ, and so forth as the system data D13. These data may be data with a time stamp or PMU data. More specifically, for example, the voltage and the voltage phase angle at each of the nodes 120B and 120C connecting to the electric power system 100, a line flow (P+jQ) of each of the branches 140B and 140C connecting to the nodes 120B and 120C connecting to the electric power system. 100, the line flow (P+jQ) of each of the transformers 130A and 130B connecting to the nodes 120B and 120C connecting to the electric power system 100, the voltage V and the voltage phase angle δ of each of the nodes 120A and 120D connecting to the transformers 130A and 130B, the active power P, the reactive power Q and the power factor Φ of each of the generators 110A and 110B connecting to the nodes 120A and 120D, the active power P, the reactive power Q, the power factor Φ, the voltage V and the voltage phase angle δ of each of other nodes, branches, generators, loads, control devices, etc. connecting to the electric power system 100 measured from the measurement device 150, the monitoring control device 200 or the like via the communication network, and so forth are taken in as the system data D13 and stored in the system condition database DB26.

Incidentally, the voltage phase angle δ may also be an angle measured by using a different measurement instrument employing GPS or PMU. Incidentally, the measurement device is a VT, PT or the like. The line flow (P+jQ) can be calculated from the current I, the voltage V and the power factor Φ measured with a VT, PT or the like. Further, it is desirable to also store the result of estimate calculation of likely values of the active power P, the reactive power Q, the voltage V, the voltage phase angle δ, the current I and the power factor Φ of each node, branch, generator, load and control device of the system, obtained as calculation result of the system condition prediction program P57, as system measurement data.

The system model database DB27 stores and includes data regarding the system configuration, line impedance (R+jX) and capacitance to the ground (admittance: Y), data necessary for the system configuration and condition estimation, (e.g., threshold values of bad data), generator data, and data necessary for other flow calculation, condition estimation and time-series variation calculation. Incidentally, when data input is made by manual operation, the data is inputted manually through the input unit 13 and stored. At the time of input, necessary image data is generated by the CPU 11 and displayed on the display unit 15. At the time of input, semi-manual operation may be employed by using a complementing function so that a lot of data can be set.

Figure 20:
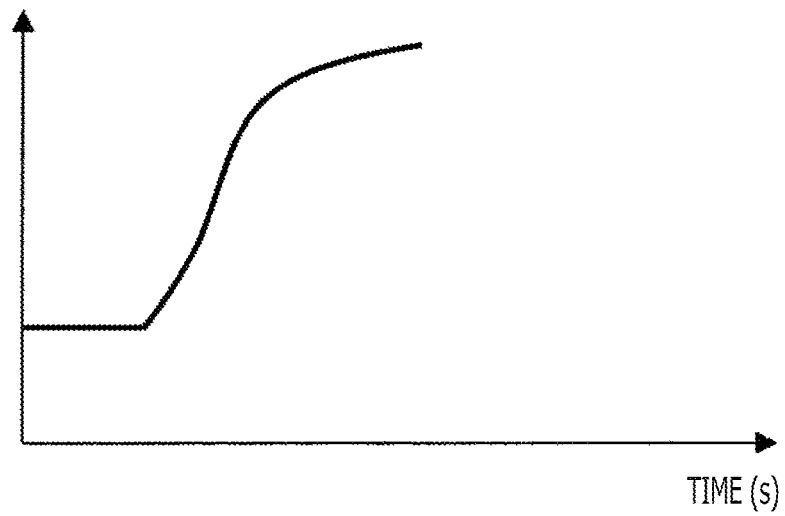
FIG. 20 is a diagram showing an example of a system condition prediction result.

The system condition prediction result database DB46 stores the result of the calculation performed by the system condition prediction program. P57 by use of the renewable energy output power prediction result data D45, the system condition data D26 and the system model data D27. For example, the system condition prediction result database DB46 stores time-series variation in the internal phase angle of a generator like that shown in FIG. 20. Details of the method of the system condition prediction will be described later.

The control target determination result database DB47 stores the result of the calculation performed by the control target determination program P58 by use of the system condition prediction result data D46. The method of the control target determination will be described later.

Figure 21:
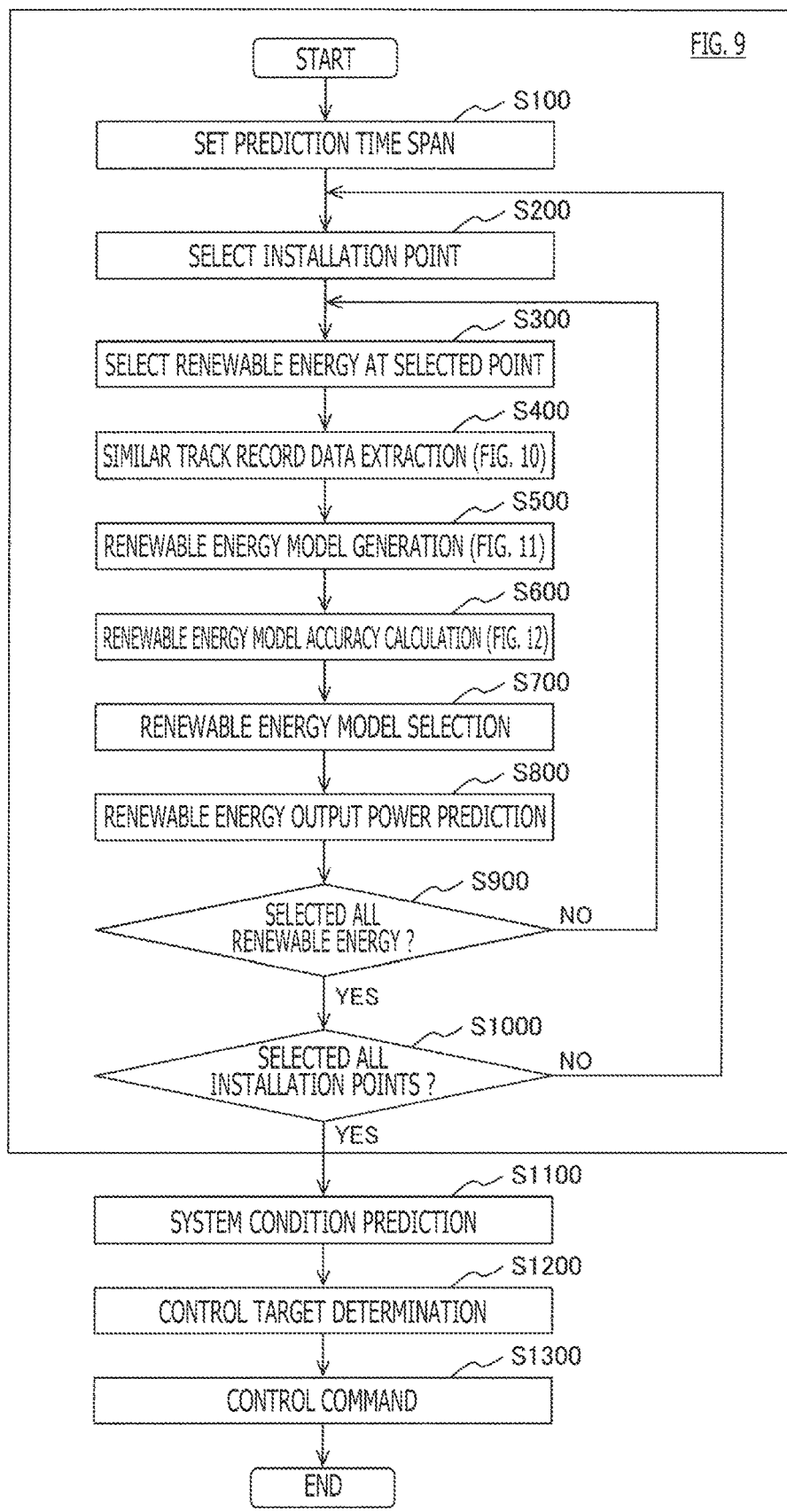
FIG. 21 is a flow chart showing the whole of arithmetic processing performed by the system stabilization apparatus.

Next, details of calculation processing performed by the system stabilization apparatus 1000 will be described below with reference to FIG. 21. FIG. 21 is an example of a flowchart showing the whole of the processing performed by the system stabilization apparatus 1000. The flow of FIG. 21 uses the processing result of the flowchart of FIG. 9 and includes processing steps S1100, S1200 and S1300 as newly added processing. Therefore, the following explanation of the processing by the system stabilization apparatus 1000 will be given mainly of the newly added processing steps S1100, S1200 and S1300.

In the newly added processing step S1100, the system condition is predicted by calculating the time-series variation in the system condition by using the renewable energy output power prediction result data D45, the system condition data D26 and the system model data D27, and the result of the prediction is stored in the system condition prediction result database DB46. The calculation of the time-series variation in the system condition is performed according to a method like that described in Akihiko Yokoyama, Koji Ota, "System Engineering of the Electric Power System Stabilization," The Institute of Electrical Engineers of Japan, 2014, pp. 54-57, for example. By the calculation, the time-series variation in the system condition can be predicted, and thus system stability in regard to an intended time can be evaluated. Further, a stabilization control target can be figured out in regard to various types of system stability such as transient stability, voltage stability and frequency stability.

In processing step S1200, a control target for the system stabilization is determined by using the system condition prediction result data D46, and the result of the determination is stored in the control target determination result database DB47. The determination of the control target is made according to a method like an online TSC system installation method described in Akihiko Yokoyama, Koji Ota, "System Engineering of the Electric Power System Stabilization," The Institute of Electrical Engineers of Japan, 2014, pp. 189-191, for example.

In processing step S1300, a control command is transmitted to the control target by using the control target determination result data D47.

Here, an example of a specific display content will be described with reference to FIG. 22. While the display screen of FIG. 22 is basically identical with the display screen in the power generation amount prediction apparatus 10 (FIG. 16), the display screen is illustrated here since it is effective also as a display content in the system stabilization apparatus 1000.

Figure 22:
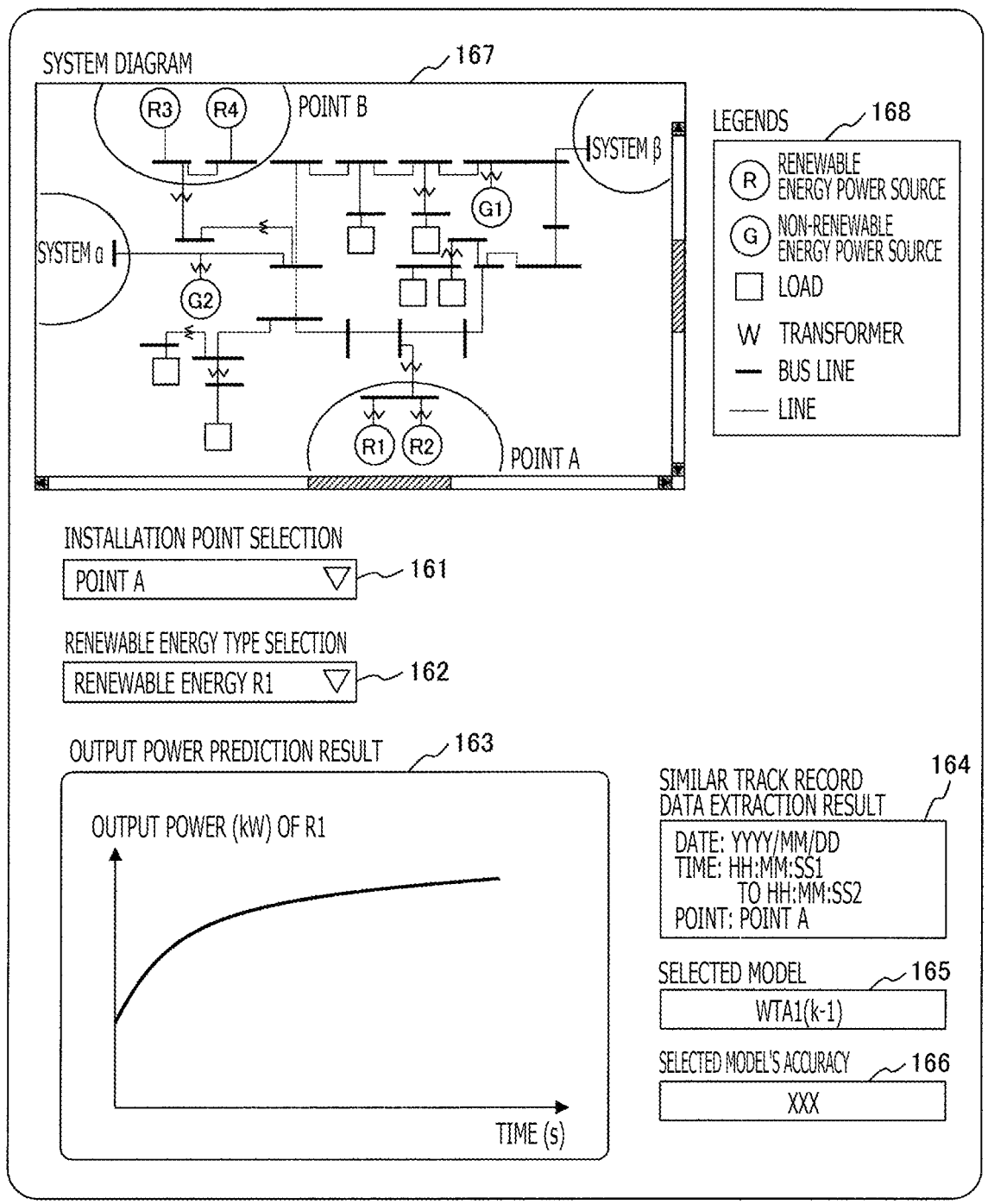
FIG. 22 is a diagram showing a screen display example of the system stabilization apparatus.

In FIG. 22, the renewable energy installation point 161 as the output power prediction target, the renewable energy type 162, the output power prediction result 163, the similar track record data extraction result 164, the renewable energy model selection result 165 and the renewable energy model accuracy calculation result 166 are displayed on the display screen as the result of the similar track record data extraction, the renewable energy model generation, the renewable energy model accuracy calculation, the renewable energy model selection and the renewable energy output power prediction. This display is made in a display format easily understandable to the user by also displaying the system diagram 167 and the legends 168.

By displaying the renewable energy output power prediction result on the screen of the monitoring control device 200 as shown in FIG. 22 via the system stabilization apparatus 1000 and the communication network 300, an effect is achieved in that the operator can grasp at a glance what kind of output power prediction has been made for what type of renewable energy in the electric power system 100.

Further, when there exist multiple types of renewable energy as the output power prediction targets, it is possible to select the renewable energy installation point 161 and the renewable energy type 162 and thereby check the output power prediction result, the similar track record data extraction result, the renewable energy model selection result and the renewable energy model accuracy calculation result of the selected renewable energy.

Figure 23:
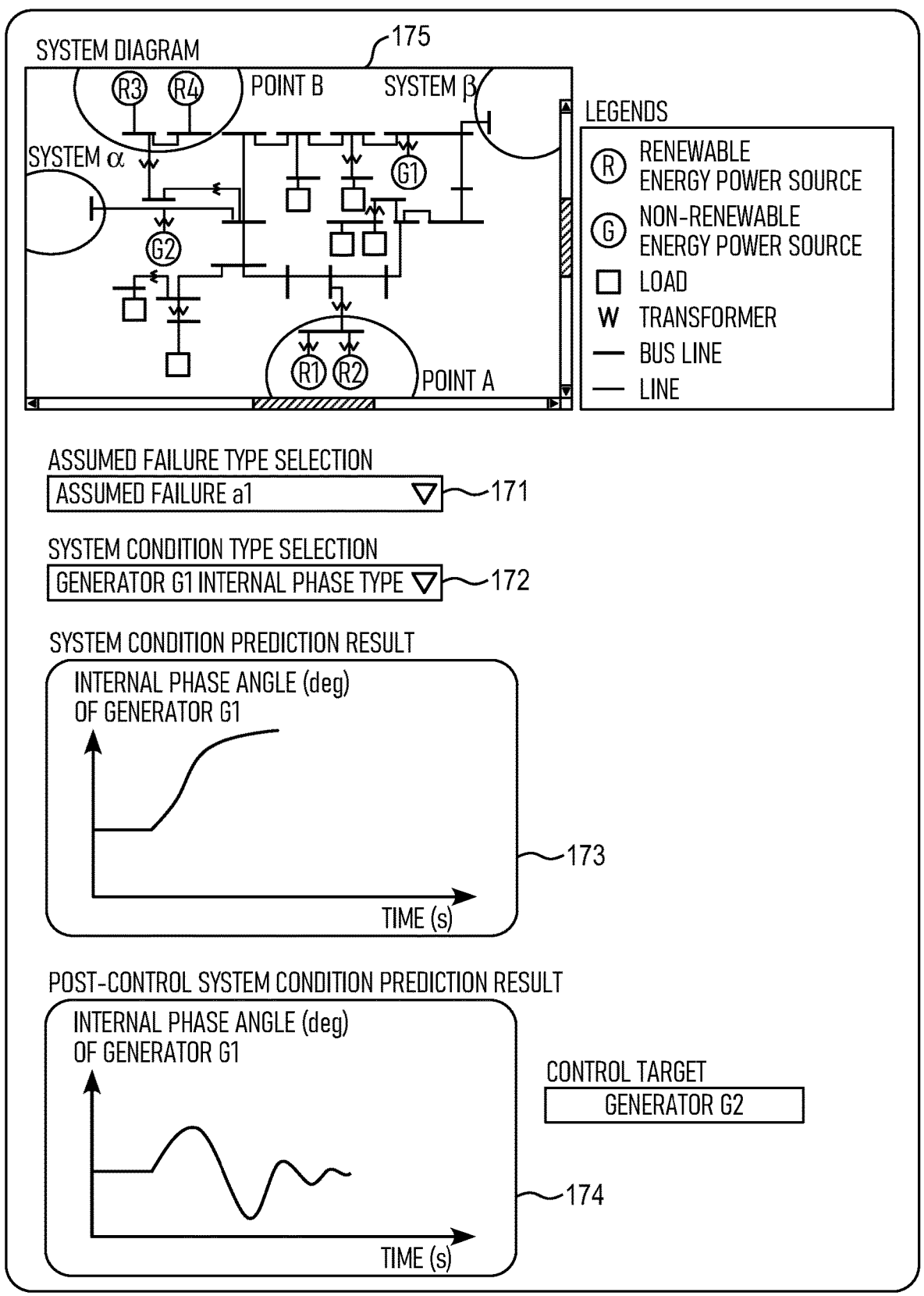
FIG. 23 is a diagram showing a screen display example of the system stabilization apparatus.

Another example of a specific display content will be described with reference to FIG. 23. FIG. 23 is a diagram showing an example of a screen 175 displaying an assumed failure type 171, a system condition type 172, a system condition prediction result 173, a post-control system condition prediction result 174 and a control target as the result of the system condition prediction and the control target determination.

By displaying the system condition prediction result before and after the control and the control target on the screen of the monitoring control device 200 as shown in FIG. 23 via the system stabilization apparatus 1000 and the communication network 300, an effect is achieved in that the operator can grasp at a glance what kind of prediction result has been obtained for what system condition and how the system condition prediction result has changed due to what control in the electric power system 100.

Further, when there exist multiple assumed failures and multiple system conditions as prediction targets, it is possible to select the types of assumed failure and system condition and thereby check the control target determination result and the prediction result of the system condition before and after the control in regard to the selected assumed failure.

In the above-described system stabilization apparatus of the second embodiment, a renewable energy model is generated based on the weather track record data D22, the renewable energy output power track record data D23, the renewable energy characteristic data D24 and the renewable energy installation condition data D25. Weather track record data similar to the weather prediction data and renewable energy output power track record data at the time of the weather are extracted based on the weather prediction data D21, the weather track record data D22, the renewable energy output power track record data D23, the renewable energy characteristic data D24 and the renewable energy installation condition data D25. The accuracy of the renewable energy model is calculated based on the renewable energy model generation result data D41, the similar track record data extraction result data D42 and the renewable energy model selection result data D44. The renewable energy model used for the output power prediction is selected based on the renewable energy model accuracy calculation result data D43. The renewable energy output power is predicted based on the renewable energy model selection result data D44 and the weather prediction data D21. The control target for the system stabilization is determined based on the system condition prediction result data D46. The control command is issued to the control target based on the control target determination result data D47. The result of the prediction and each calculation result are displayed.

According to the second embodiment, the system can be stabilized with high probability by the above-described operation.

DESCRIPTION OF REFERENCE CHARACTERS

10: Power generation amount prediction apparatus
11: CPU
12: Memory
13: Input unit
14: Communication unit
15: Display unit
30: Power generation amount predictive calculation unit
31: Renewable energy model generation unit
32: Similar track record data extraction unit
33: Renewable energy model accuracy calculation unit
34: Renewable energy model selection unit
35: Renewable energy output power prediction unit
36: System condition prediction unit
37: Control target determination unit
38: Control command unit
60: Bus line
100: Electric power system
110A, 110B: Generator
120A, 120B, 120C, 120D: Node (bus line)
130A, 130B: Transformer
140A, 140B, 140C, 140D: Branch (line)
150: Measurement device
200: Monitoring control device
300: Communication network
1000: System stabilization apparatus
D20: Power generation amount predictive calculation input data
DB20: Power generation amount predictive calculation input database
D21: Weather prediction data
DB21: Weather prediction database
D22: Weather track record data
DB22: Weather track record database
D23: Renewable energy output power track record data
DB23: Renewable energy output power track record database
D24: Renewable energy characteristic data
DB24: Renewable energy characteristic database
D25: Renewable energy installation condition data
DB25: Renewable energy installation condition database
D40: Power generation amount predictive calculation result data
DB40: Power generation amount predictive calculation result database
D41: Renewable energy model generation result data
DB41: Renewable energy model generation result database
D42: Similar track record data extraction result data
DB42: Similar track record data extraction result database
D43: Renewable energy model accuracy calculation result data
DB43: Renewable energy model accuracy calculation result database
D44: Renewable energy model selection result data
DB44: Renewable energy model selection result database
D45: Renewable energy output power prediction result data
DB45: Renewable energy output power prediction result database
D50: Program data
DB50: Program database
D26: System condition data
DB26: System condition database
D27: System model data
DB27: System model database
D46: System condition prediction result data
DB46: System condition prediction result database
D47: Control target determination result data
DB47: Control target determination result database
D51: System stabilization program data
DB51: System stabilization program database

The invention claimed is:

1. A system stabilization apparatus that stabilizes an electric power system, including a power plant performing power generation by use of renewable energy, comprising:
a central processing unit (CPU);
a power generation amount prediction apparatus for predicting a power generation amount at a power plant that performs power generation by use of renewable energy, comprising:
a first database memory in communication with the CPU, the first database memory storing a plurality of instructions executable by the CPU to cause the implementation of:
a model generation unit that generates a model of the power generation amount of the power plant in regard to each model generation time based on a weather track record and an output power track record in regard to the power plant;
a similar track record data extraction unit that obtains a weather track record similar to weather prediction data and a corresponding output power track record as similar track record data;
a model accuracy unit that determines accuracy of each of a plurality of models of the model generation unit in a weather condition similar to the weather prediction data by using the similar track record data, wherein
each of the models in the plurality of models differ by one or more of a recorded model generation time and/or a power generation site;
a model selection unit that selects a model from the plurality of models to be used for the prediction by using the accuracy of each of the models; and
a model output power prediction unit that predicts the power generation amount of the power plant by using the selected model; and
a second database memory in communication with the CPU, the second database memory storing a second plurality of instructions executable by the CPU to cause the implementation of:
a system condition prediction unit that predicts a system condition of the electric power system including the power plant performing the power generation by use of renewable energy in terms of a time series by using the predicted power generation amount;
a control target determination unit that determines a control target generator for system stabilization when a deterioration in the predicted system condition is predicted; and a control command unit that transmits a control command to the determined control target generator to control an output of the determined control target generator to stabilize the system condition of the electric power system including the power plant.

2. The system stabilization apparatus that stabilizes an electric power system according to claim 1, wherein the model generation unit obtains the model by adding a characteristic and an installation condition of the power plant to a primary model of the power plant generated based on the weather track record and the output power track record.

3. The system stabilization apparatus that stabilizes an electric power system according to claim 1, wherein the similar track record data extraction unit extracts the weather track record similar to the weather prediction data, extracts an output power track record at a time of the weather track record, and thereby obtains the weather track record and the output power track record in combination.

4. The system stabilization apparatus that stabilizes an electric power system according to claim 1, wherein when the similar track record data extraction unit has no weather track record similar to the weather prediction data in regard to a first power plant, the model selection unit selects a model of a second power plant having a similar weather track record.

5. The system stabilization apparatus that stabilizes an electric power system according to claim 1, wherein:
the model generation unit generates a model of renewable energy by using weather track record data, output power track record data of renewable energy, characteristic data of renewable energy and installation condition data of renewable energy,
the similar track record data extraction unit extracts weather track record data similar to the weather prediction data and corresponding output power track record data by using the weather prediction data, the weather track record data and the output power track record data,
the model accuracy unit determines accuracy of the model by using the model, the similar track record data and model selection result data,
the model selection unit selects a model to be used for the prediction by using the accuracy of each model, and
the model output power prediction unit predicts renewable energy output power by using the selected model.

6. The system stabilization apparatus that stabilizes an electric power system according to claim 5, wherein the model generation unit adds the characteristic data and the installation condition data of the same renewable energy to the model generated based on the weather track record data and the output power track record data.

7. The system stabilization apparatus that stabilizes an electric power system according to claim 5, wherein the model accuracy unit determines the accuracy of the model based on output power track record data obtained by inputting the weather track record data included in the similar track record data to the model generated by the model generation unit and the output power track record data included in the similar track record data, and determines the accuracy of the model included in selection result data of the model of the renewable energy output power based on output power track record data obtained by inputting the weather track record data included in the similar track record data to one or more models included in the model selection result data and the output power track record data included in the similar track record data.

8. The system stabilization apparatus that stabilizes an electric power system according to claim 5, wherein the model selection unit selects the model of the renewable energy output power having the highest accuracy by making accuracy comparison of the model of the renewable energy output power generated by the model generation unit and one of more of the models included in the model selection result data.

9. The system stabilization apparatus that stabilizes an electric power system according to claim 5, wherein the model output power prediction unit predicts the renewable energy output power by inputting the weather prediction data to the model selected by the model selection unit.

10. A system stabilization method for stabilizing an electric power system, including a power plant performing power generation by use of renewable energy, comprising:
a power generation amount prediction method for predicting a power generation amount at a power plant that performs power generation by use of renewable energy comprising:
generating a model of the power generation amount of the power plant in regard to each model generation time based on a weather track record and an output power track record in regard to the power plant; and
selecting a model to be used for the prediction from a plurality of models by determining accuracy of each of the models of the plurality of models in weather condition similar to weather prediction data extracted from the weather track record and the output power track record, wherein
each of the models in the plurality of models differ by one or more of a recorded model generation time and/or a power generation site;
predicting a system condition of the electric power system including the power plant performing the power generation by use of renewable energy in terms of a time series by using a predicted power generation amount, wherein the predicted power generation amount is predicted by using the selected model;
determining a control target generator for system stabilization upon predicting a deterioration in the predicted system condition is predicted; and
transmitting a control command to the determined control target generator to control an output of the determined control target generator to stabilize the system condition of the electric power system including the power plant.

11. The system stabilization method for stabilizing an electric power system according to claim 10, wherein the model is obtained by adding a characteristic and an installation condition of the power plant to a primary model of the power generation amount of the power plant generated based on the weather track record and the output power track record.

12. The system stabilization method for stabilizing an electric power system according to claim 10, wherein when there is no weather track record similar to the weather prediction data in regard to a first power plant, a model of a second power plant having similar weather track record and output power track record is selected as the model of the power generation amount of the first power plant.

* * * * *